Figures 1, 33:
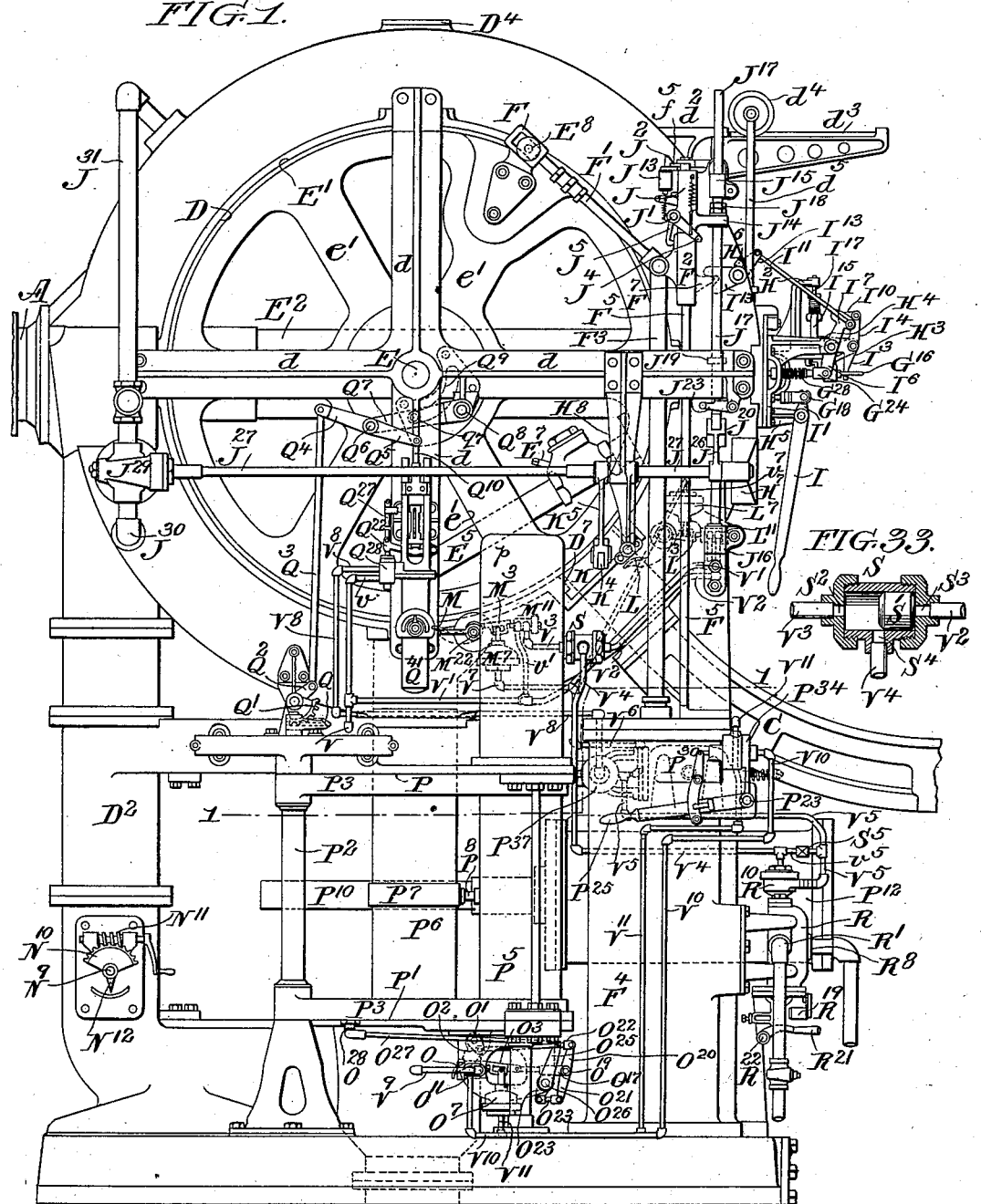

No. 722,667. PATENTED MAR. 17, 1903.
B. C. BATCHELLER.
PNEUMATIC TRANSMISSION SYSTEM.
APPLICATION FILED OCT. 5, 1898. RENEWED DEC. 19, 1902.
NO MODEL. 20 SHEETS—SHEET 1.

Witnesses:

Inventor:

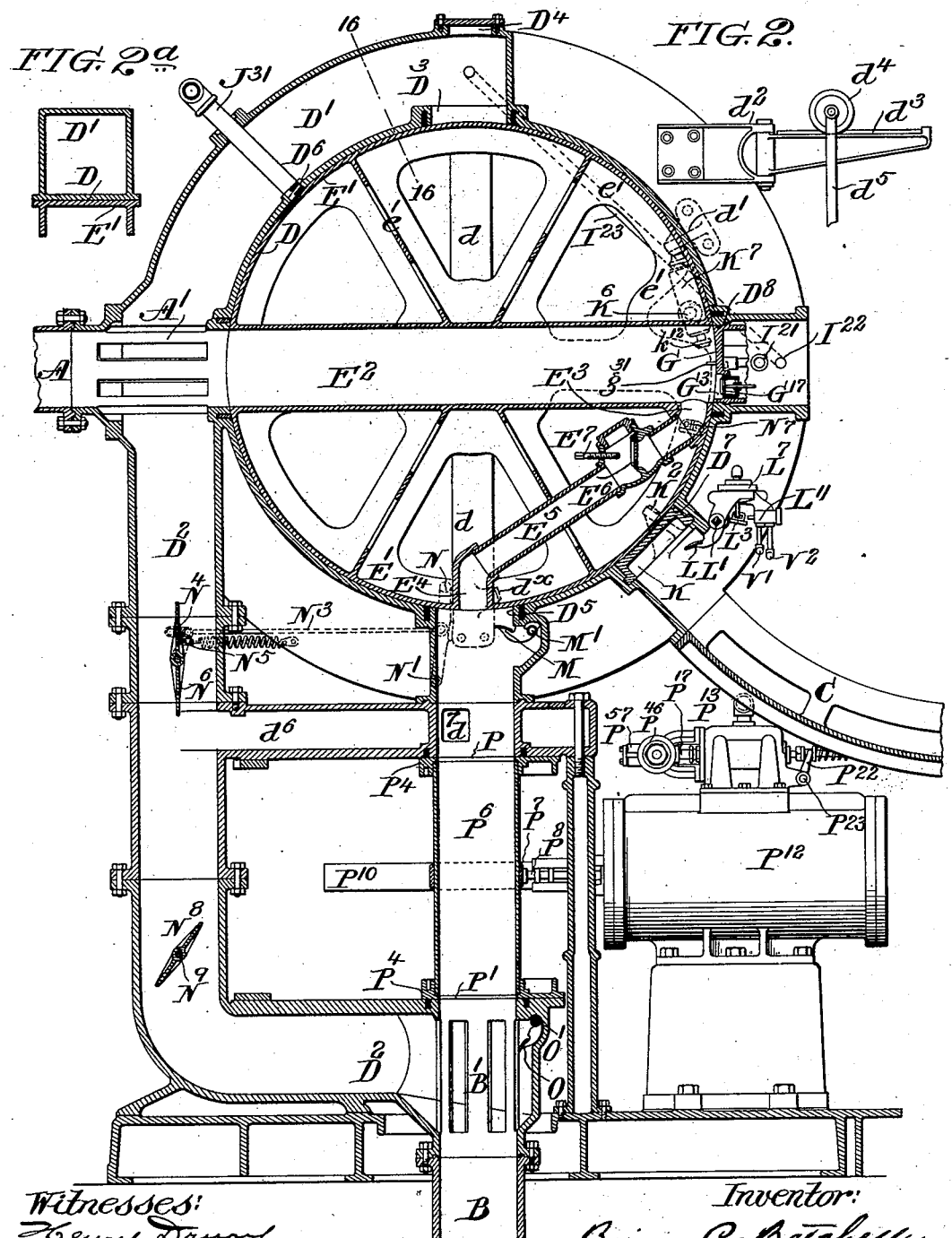

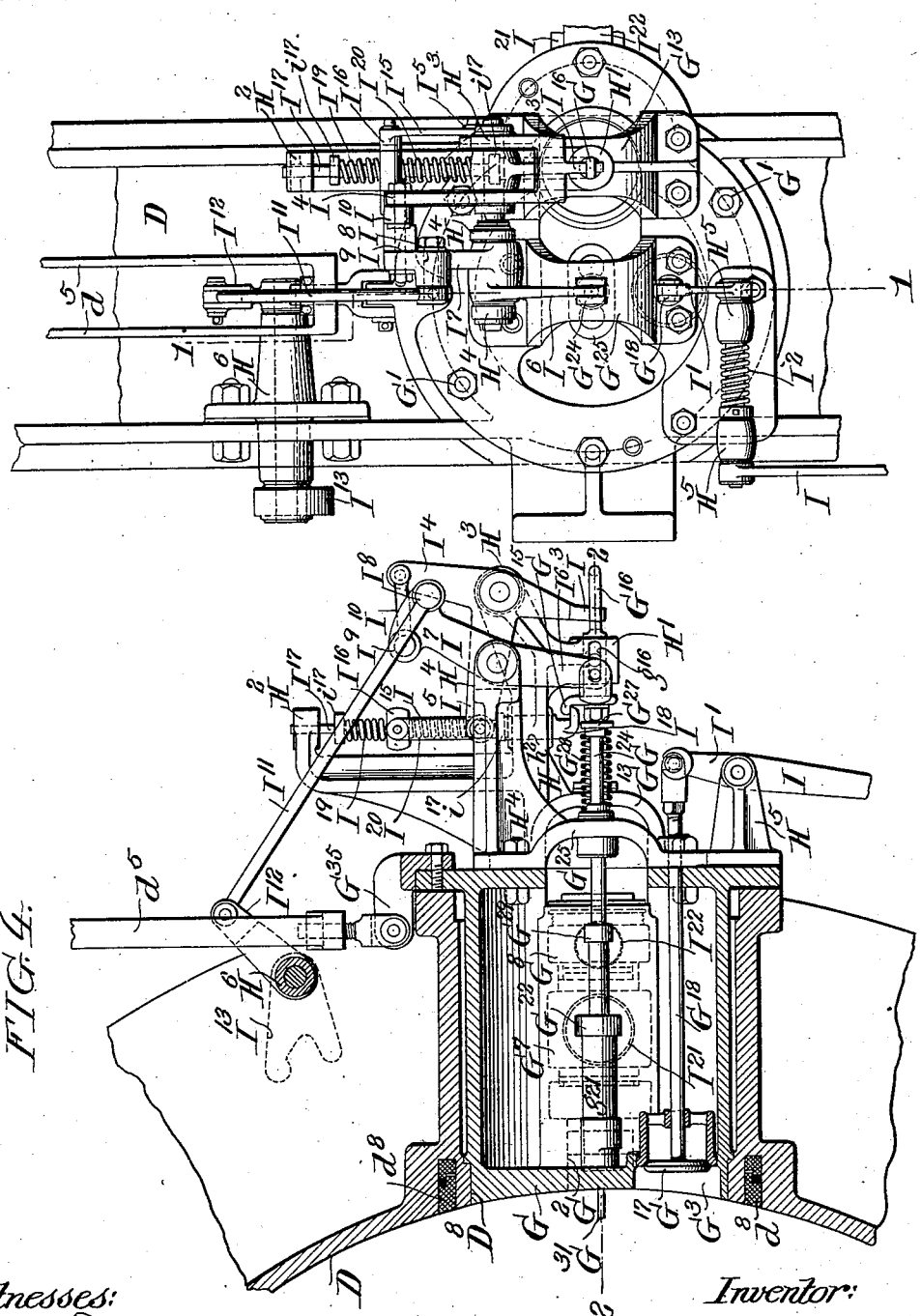

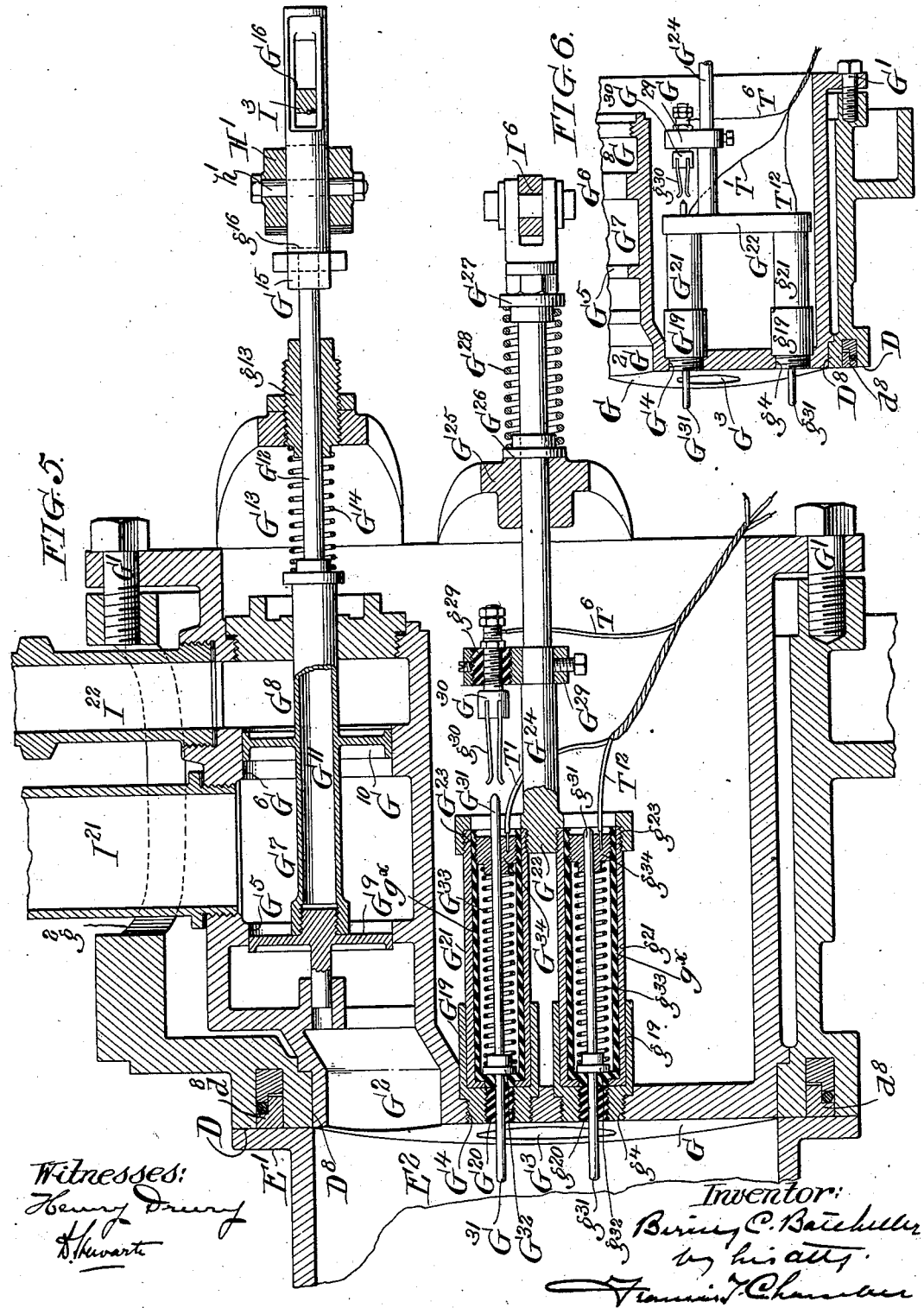

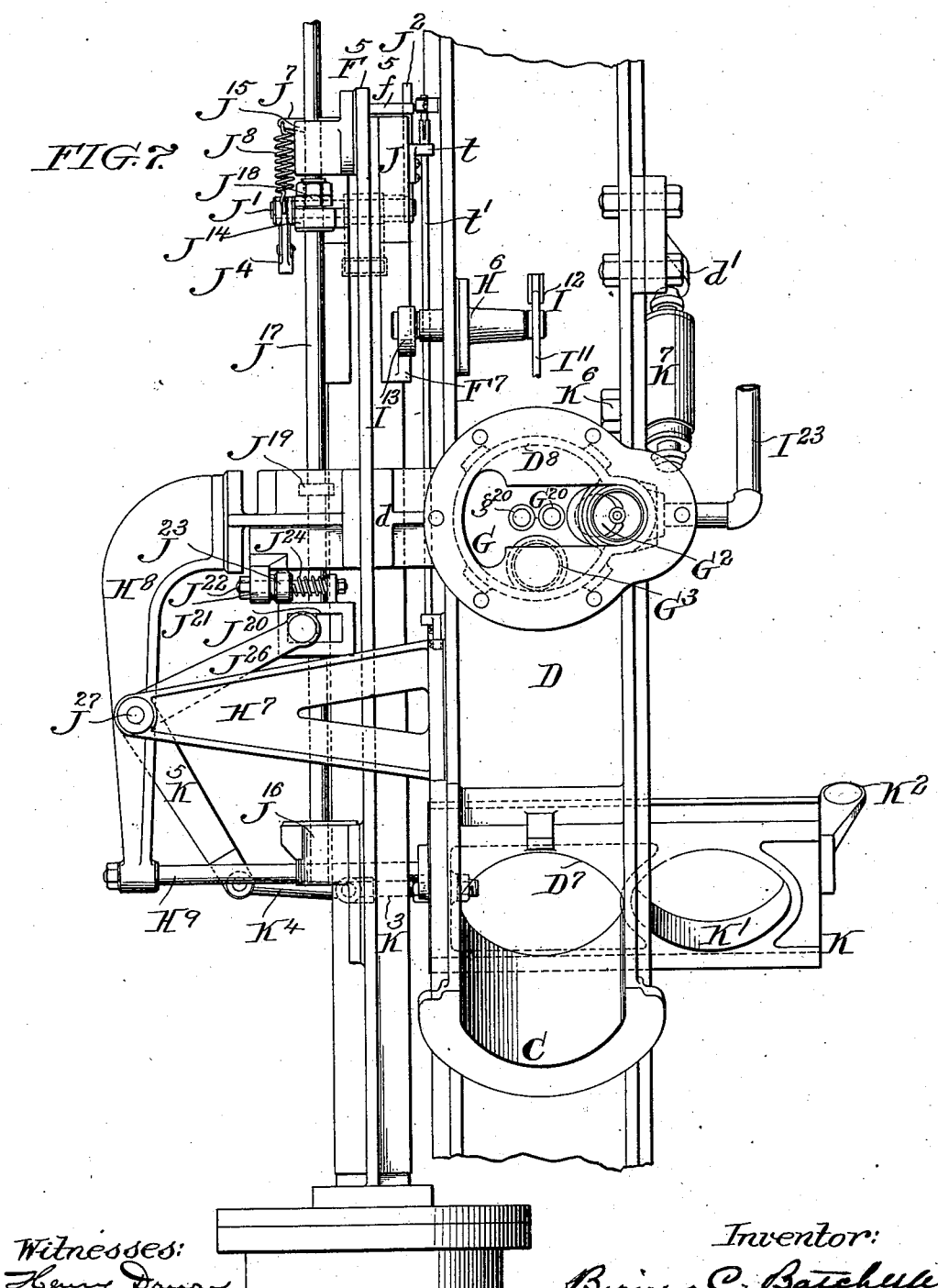

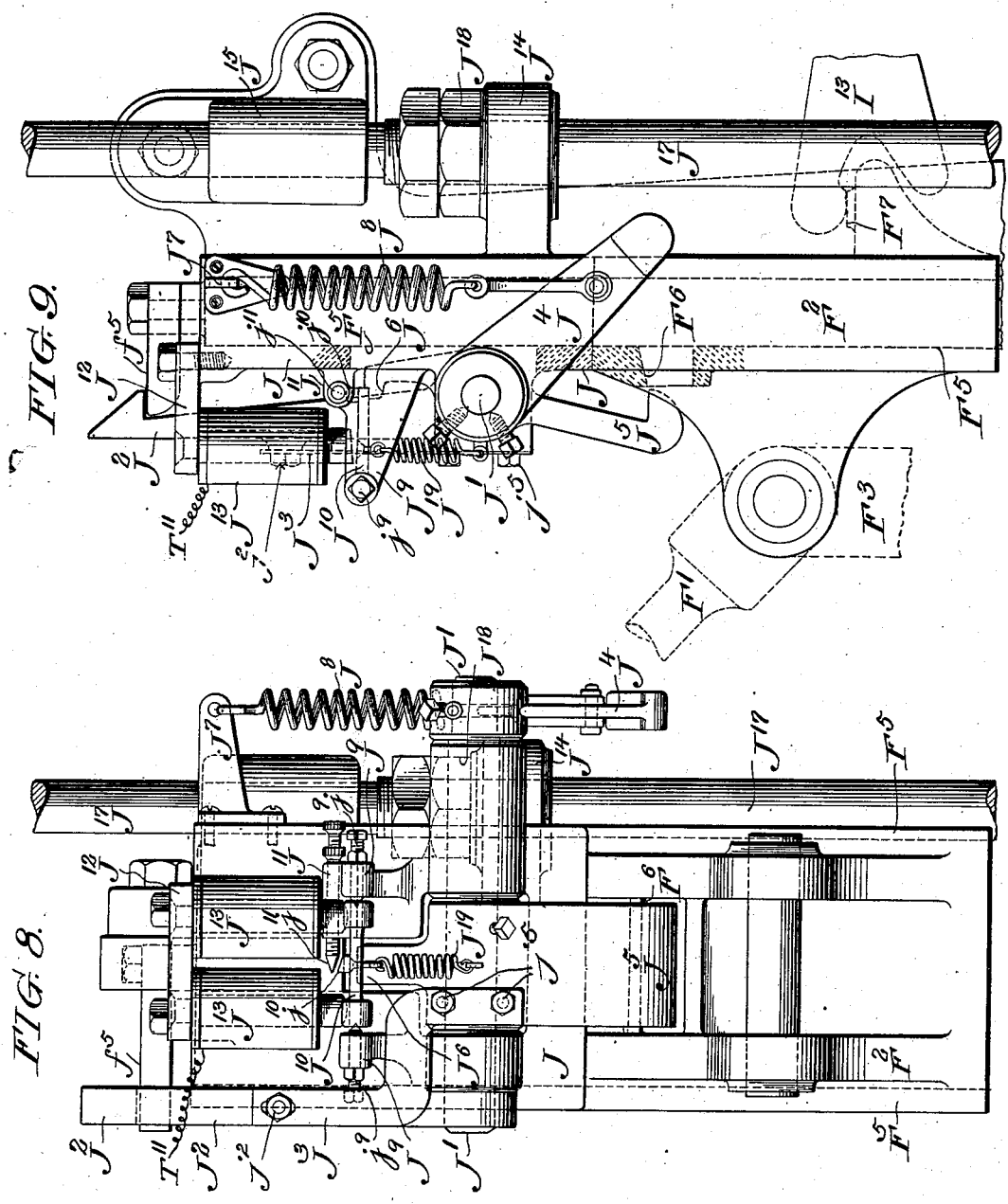

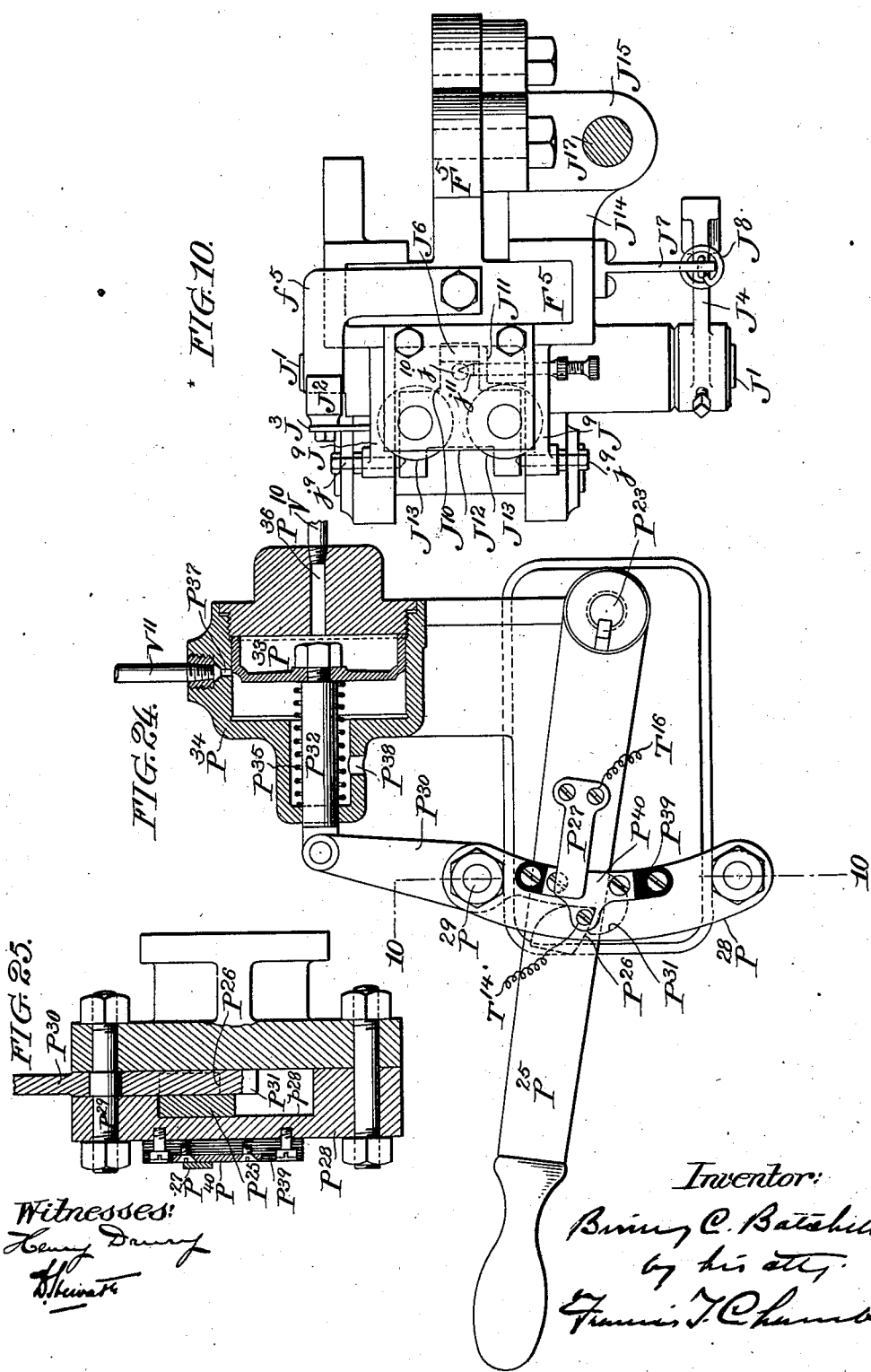

No. 722,667. PATENTED MAR. 17, 1903.
B. C. BATCHELLER.
PNEUMATIC TRANSMISSION SYSTEM.
APPLICATION FILED OCT. 5, 1898. RENEWED DEC. 19, 1902.
NO MODEL. 20 SHEETS—SHEET 8.
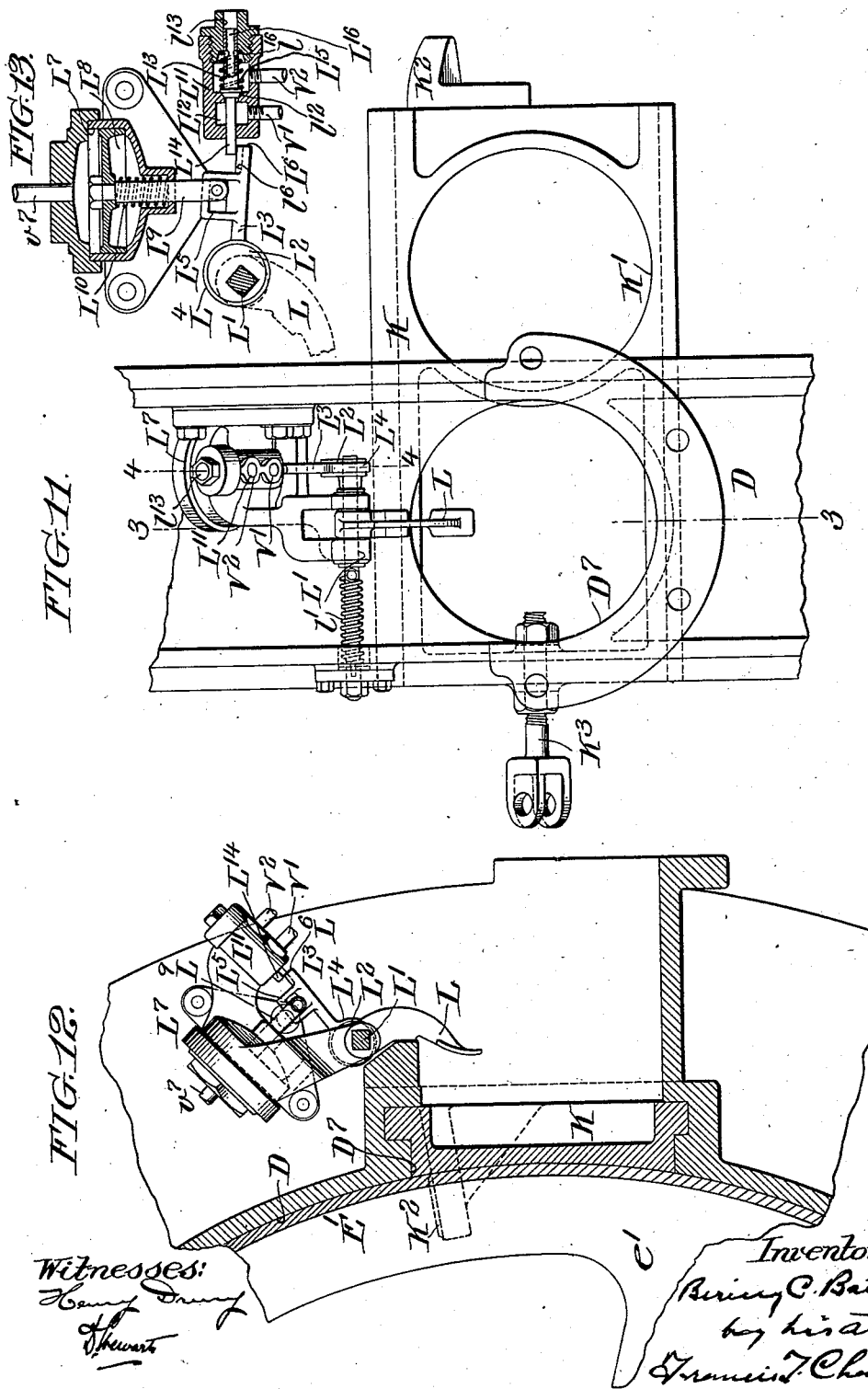

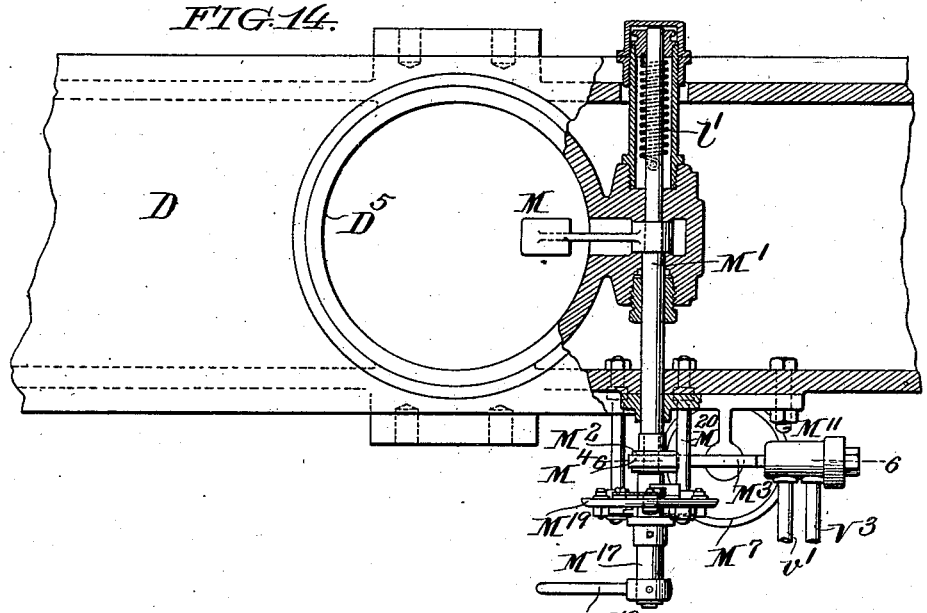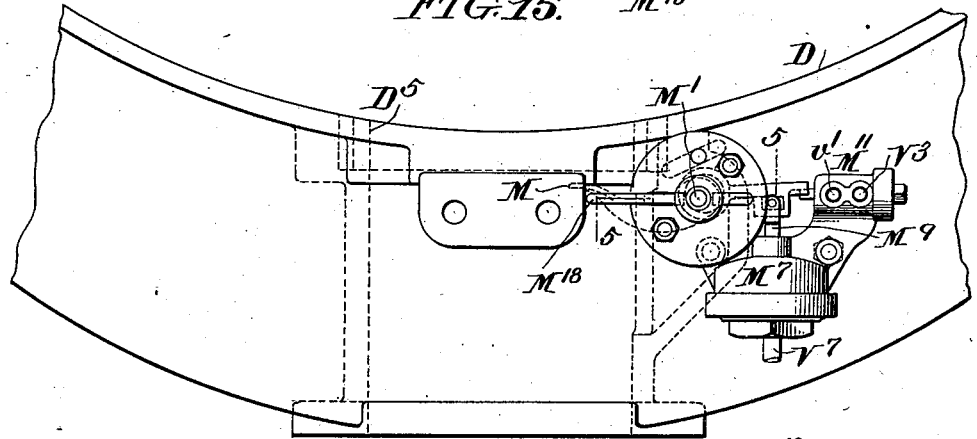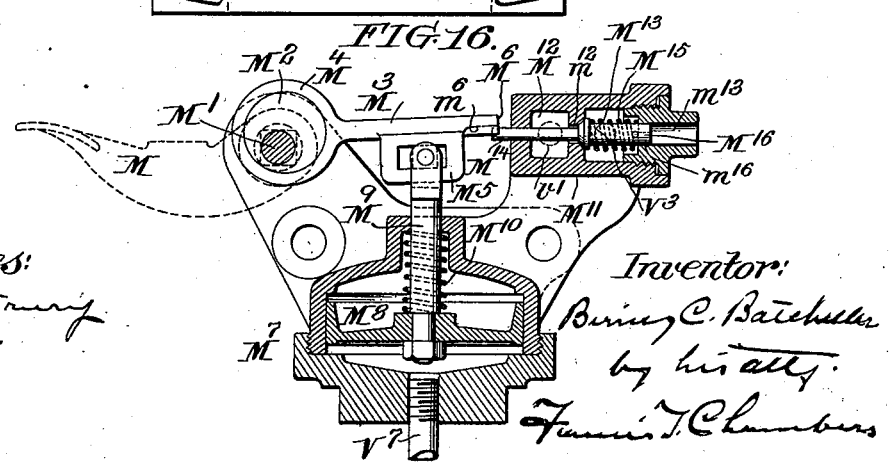

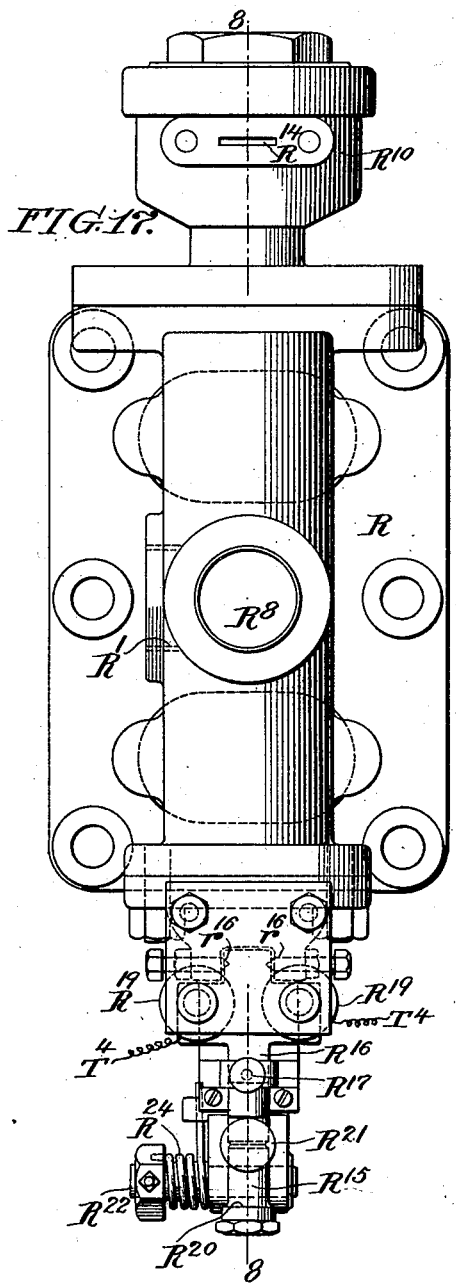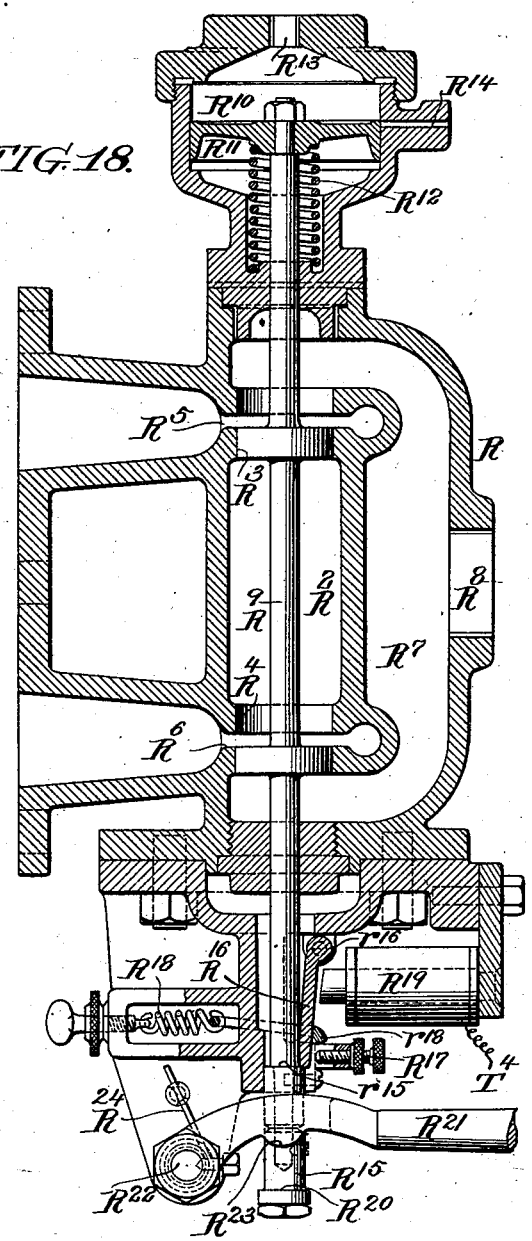

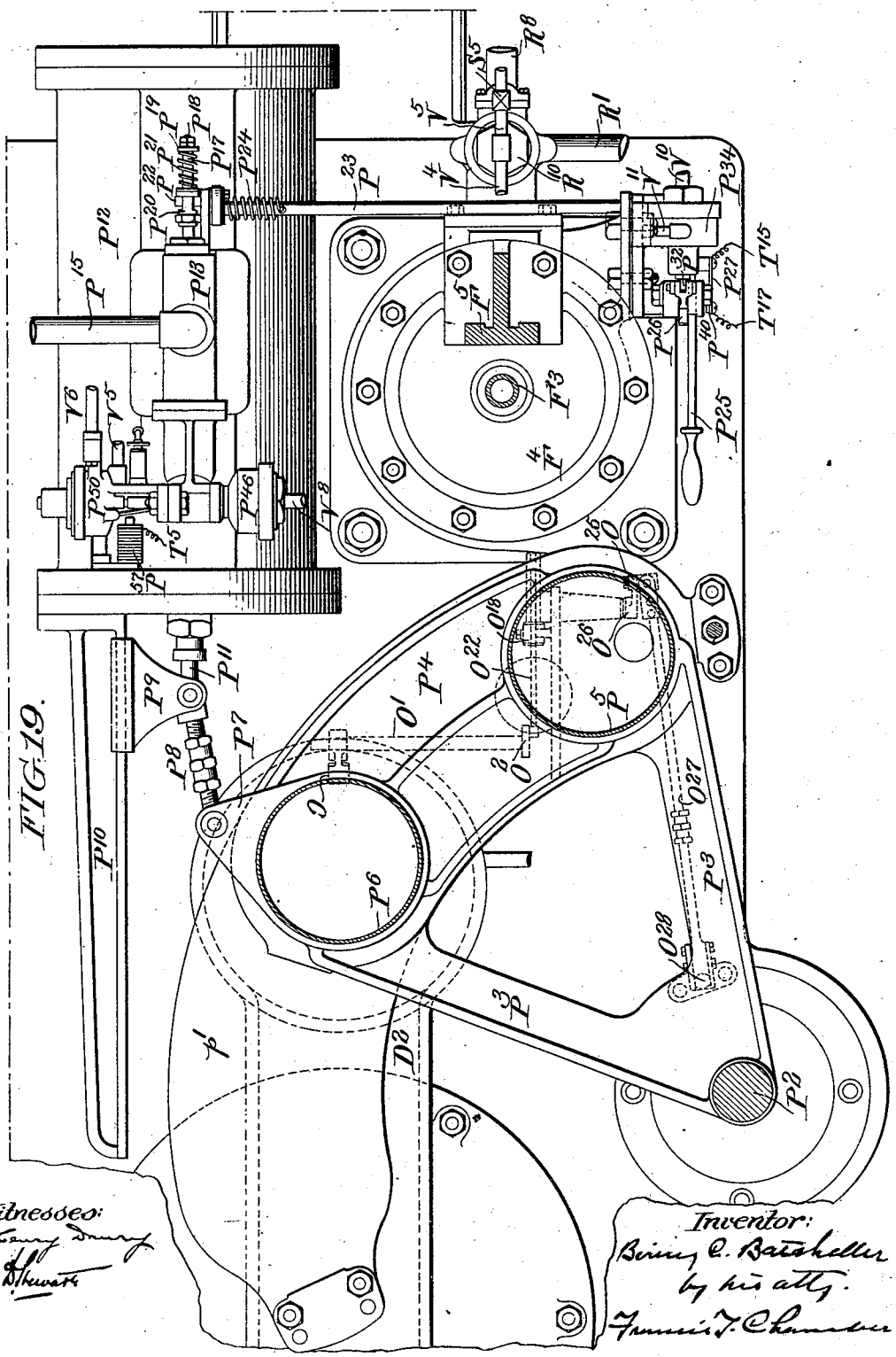

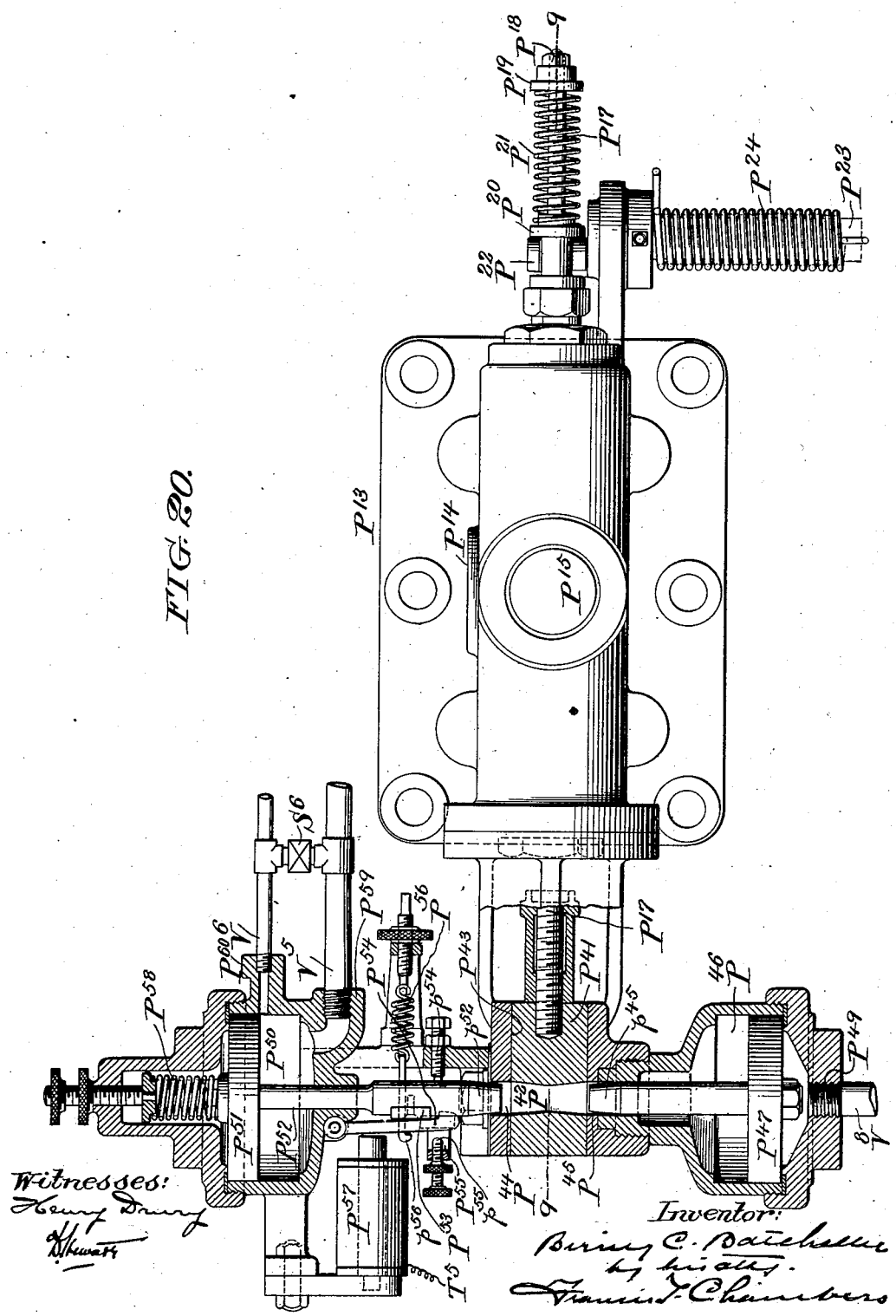

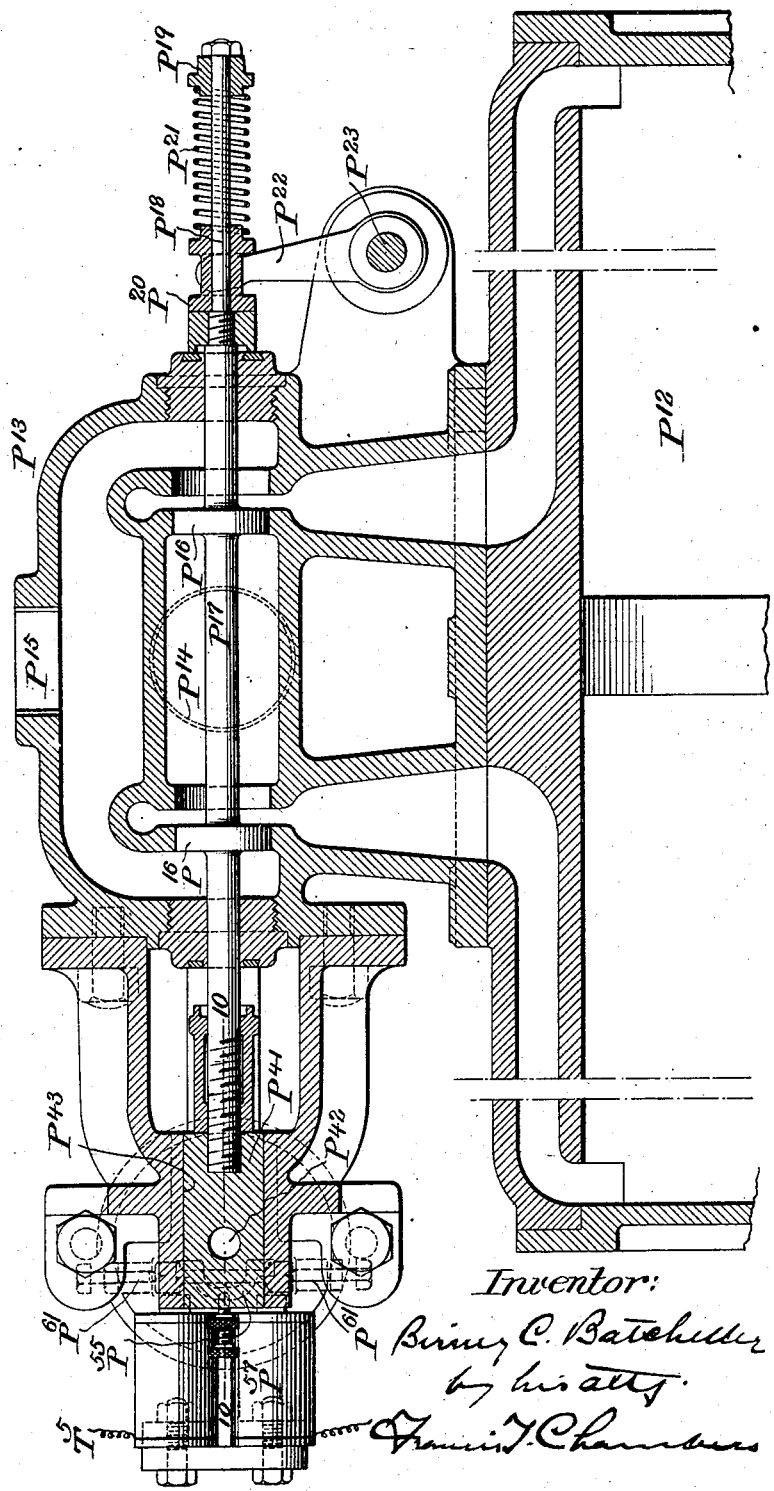

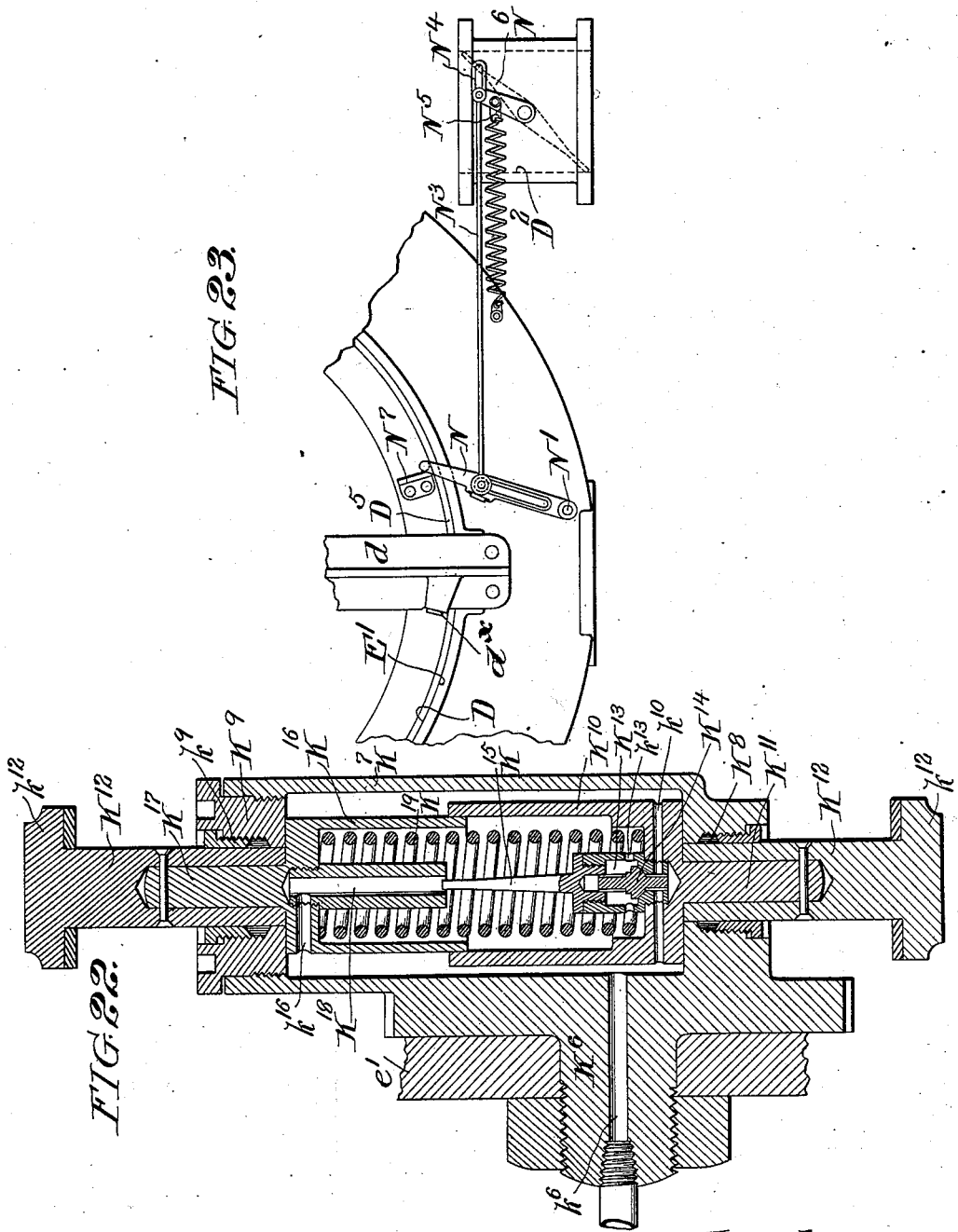

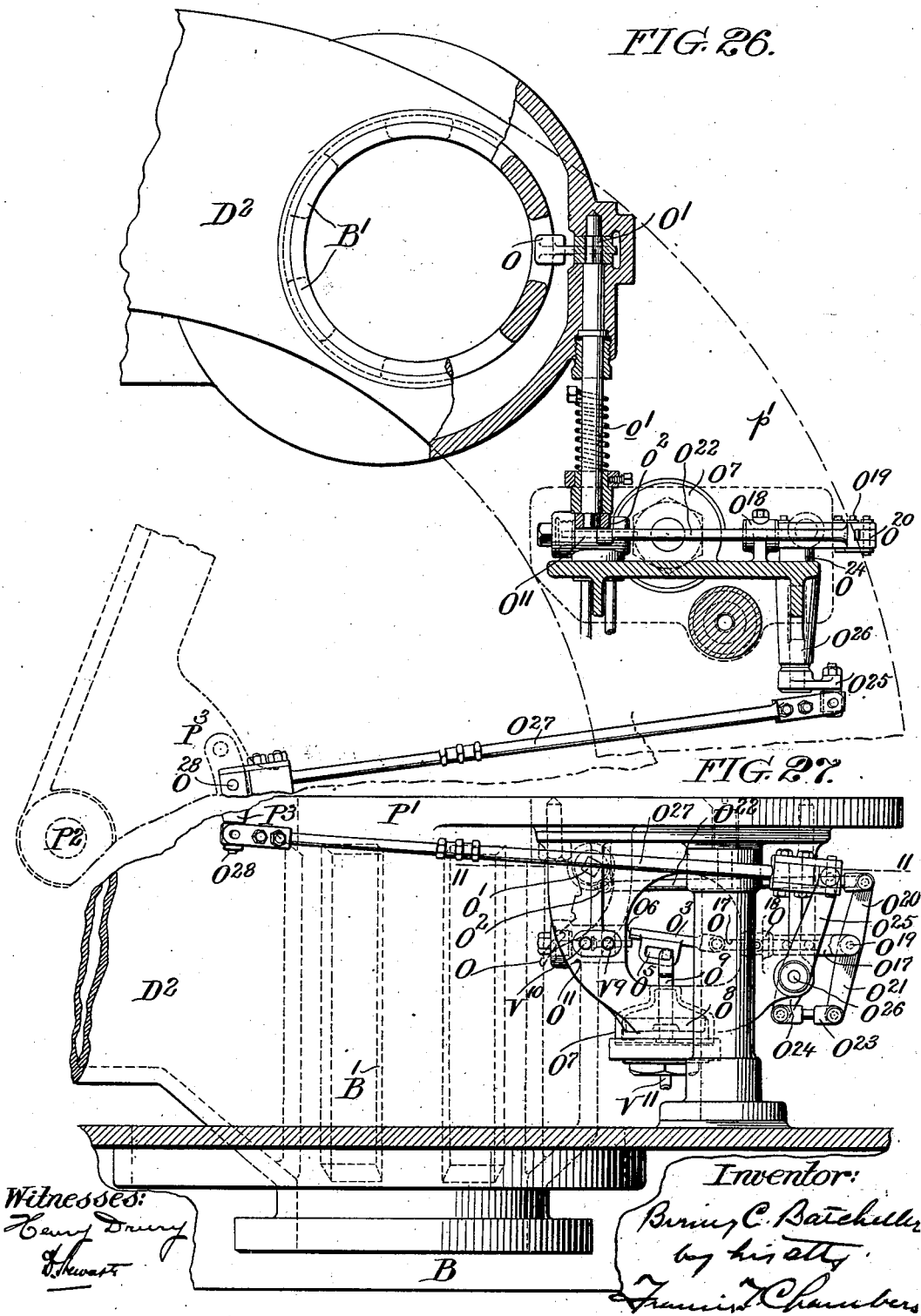

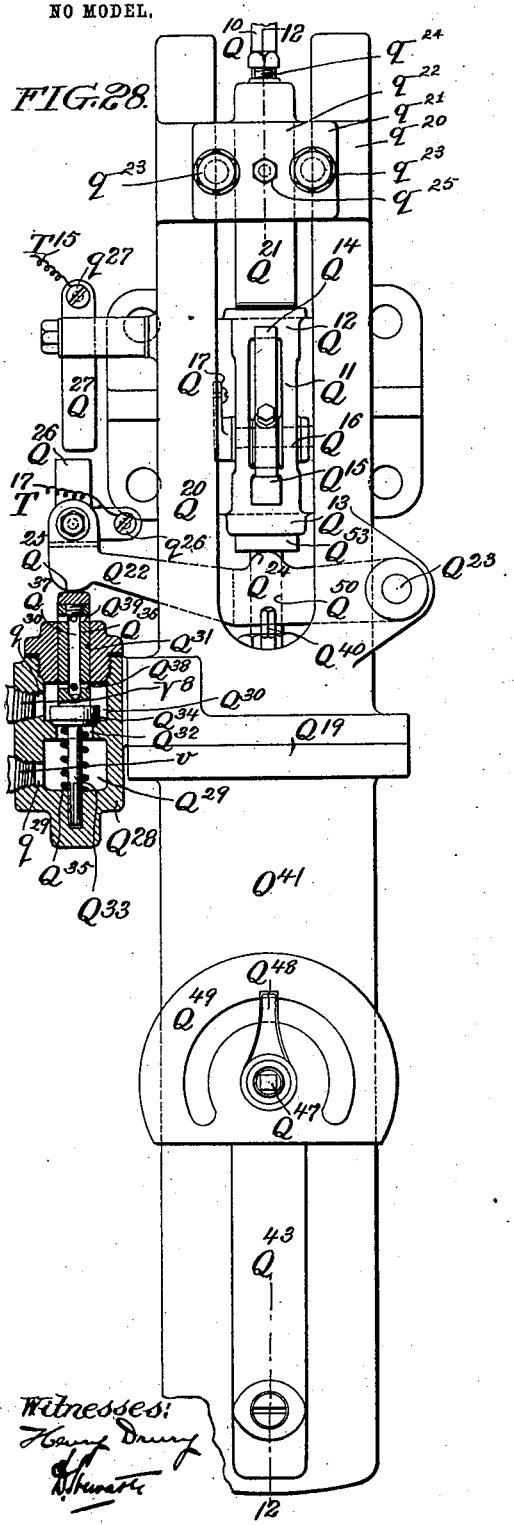

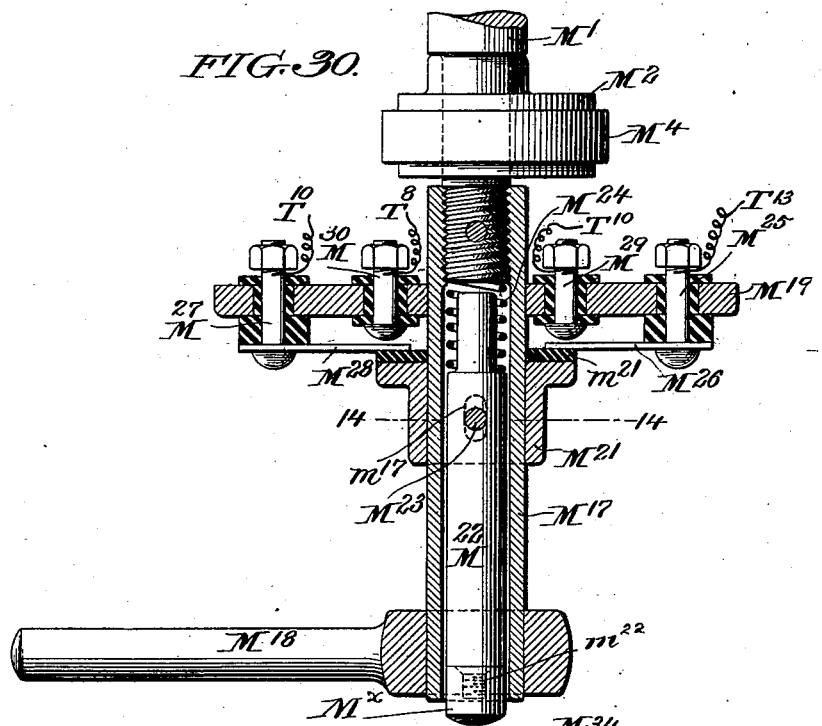

No. 722,667. PATENTED MAR. 17, 1903.
B. C. BATCHELLER.
PNEUMATIC TRANSMISSION SYSTEM.
APPLICATION FILED OCT. 5, 1898. RENEWED DEC. 19, 1902.
NO MODEL. 20 SHEETS—SHEET 18.

FIG. 34.

Witnesses:

Inventor:
Birney C. Batcheller
by his atty.
Francis T. Chambers

No. 722,667. PATENTED MAR. 17, 1903.
B. C. BATCHELLER.
PNEUMATIC TRANSMISSION SYSTEM.
APPLICATION FILED OCT. 5, 1898. RENEWED DEC. 19, 1902.
NO MODEL. 20 SHEETS—SHEET 19.

Witnesses:
Inventor:
Birney C. Batcheller
by his atty.
Francis T. Chambers

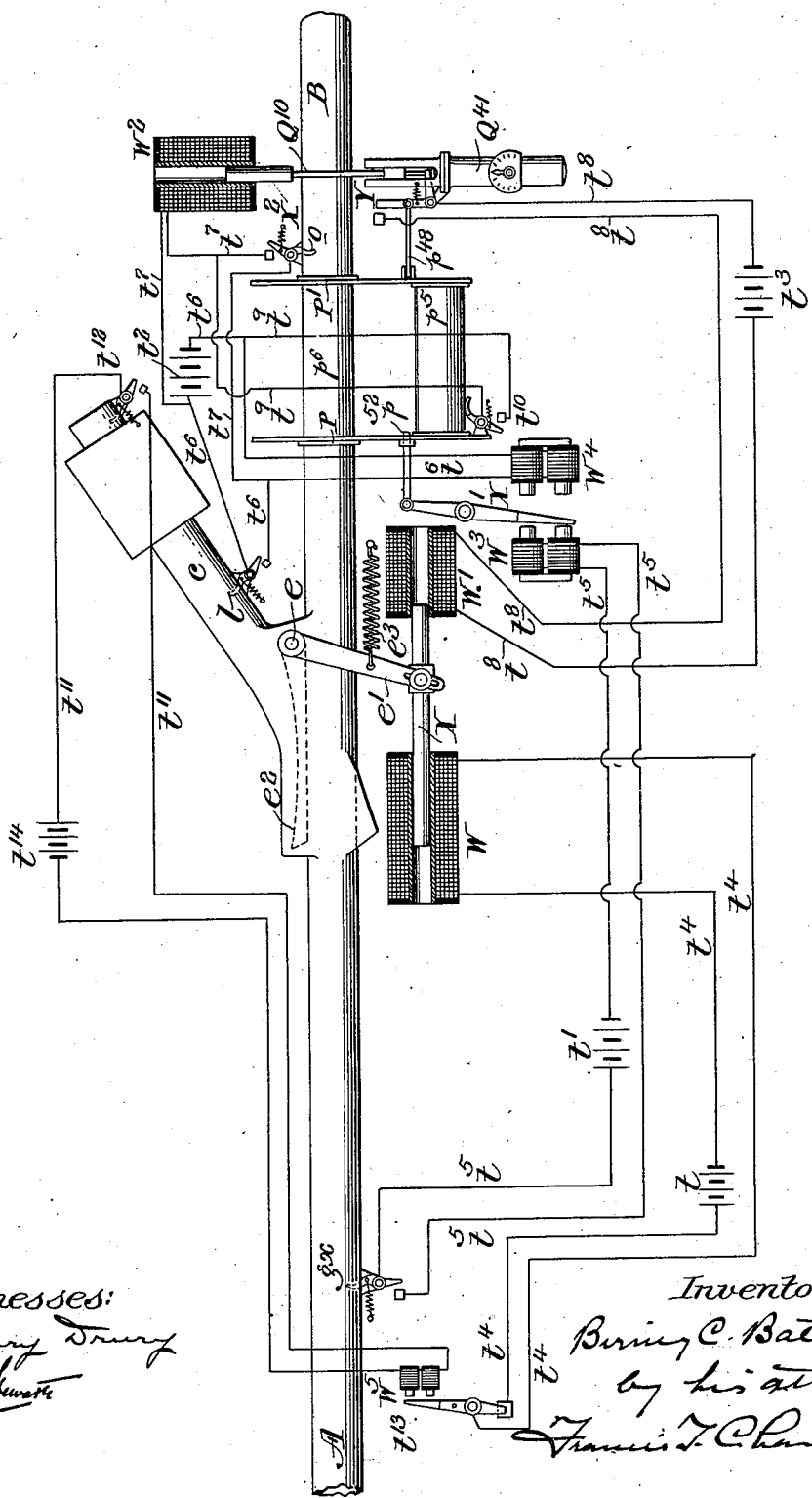

UNITED STATES PATENT OFFICE.

BIRNEY C. BATCHELLER, OF PHILADELPHIA, PENNSYLVANIA.

PNEUMATIC TRANSMISSION SYSTEM.

SPECIFICATION forming part of Letters Patent No. 722,667, dated March 17, 1903.

Application filed October 5, 1898. Renewed December 19, 1902. Serial No. 135,938. (No model.)

*To all whom it may concern:*

Be it known that I, BIRNEY C. BATCHELLER, a citizen of the United States of America, residing in the city and county of Philadelphia, in the State of Pennsylvania, have invented a certain new and Improved Pneumatic Transmission System, of which the following is a true and exact description, reference being had to the accompanying drawings, which form a part thereof.

My invention relates to the system of transmitting carriers through pneumatic tubes, and particularly to the receiving mechanism for the carriers and the combination of such receiving mechanism with sending apparatus.

The principal objects of my invention are in a system in which the receiving apparatus is of a kind which will either deliver the carrier at the point where it is situated or transmit or permit its transmission into a continuation of the conduit-tube and in connection with which apparatus a sending device is also provided to permit of the insertion of carriers at the place where the apparatus is situated to in the first place so interlock the sending and receiving apparatus that the operation of the sender will effect the delivery of carriers arriving at the receiver during or after a definite time after the operation of the sender. Preferably I use in connection with the sending apparatus a sender-actuating lever operating through resilient connections—such, for instance, as is shown and described in my Patent No. 595,754 of December 21, 1897—and, as illustrated in the drawings, I have shown such mechanism as embodying further improvements, which form the subject-matter of my application for Letters Patent filed March 26, 1898, Serial No. 675,266, and for the best results I make the movement of the sender-actuating lever result in the delivery of the carriers reaching the receiver after said lever is operated, and I also so combine the sending and receiving apparatus that the motion of the sender to inject a carrier into the tube will also effect the delivery of carriers reaching the receiver while it is in operation, using a device in the nature of a time-escapement set in operation by the movement of the sender and arranged to effect the restoration of normal operative conditions in the receiver after a determined lapse of time.

In the second place my object is to provide such interlocking mechanism between the receiver and sender as will result in the locking of the sender in its normal position on the entry into or the approach to the receiver of a carrier and during a period when the receiver is in operation, and by preference I effect this both by the shooting of a lock effected by mechanism directly actuated by the approaching carrier, said lock being withdrawn also by the action of the carrier in passing from or beyond the receiver, and also by the shooting of a lock by mechanism actuated by the movement of the receiver, by preference employing a time-escapement to effect the withdrawal of this lock a definite time after the receiver movement has been made. As will be seen, the same time-escapement device can be conveniently made to operate both on the mechanism effecting the delivery of a carrier and upon the mechanism effecting the locking of the sender.

A third object of my invention is to so control the operation of the receiver as to effect the delivery of carriers following the preceding carriers too closely, this being most conveniently effected by making each movement of the receiver from its normal receiving position effect a connection of parts which will result in the delivery of a carrier reaching the receiver while such connections exist, the operation of the connections being governed by a time-escapement, also set in operation by the movement of the receiver and which may conveniently be the same time-escapement already referred to in connection with other functions. My receiving apparatus is preferably of a type in which the motion or motions of the receiver to effect the delivery or transmission of the carrier is controlled by the presence or absence of a proper selecting device on the carrier. It is desirable, however, that the delivery of a carrier at the station where the receiving device is situated should also be within the control of the operator at that station, and a fourth object of my invention is to provide means whereby the delivery of all carriers, irrespective of their selecting devices, can be effected at the will of the operator and preferably whereby also the moving of the receiving apparatus can be effected by the operator irrespective of the action of a carrier. The receiving device which I use by preference embodies the leading features of the apparatus shown in my Patent No. 595,755, of December 21, 1897; but a further object of my invention is to improve the character of this receiving mechanism, such means being largely especially devised to facilitate the interlocking of the receiving and sending apparatus, as above indicated, but being also capable of independent useful application.

Generally speaking, therefore, my invention may be said to consist in improvements in receiving apparatus and in the combination of the apparatus provided for receiving and for sending carriers, and the nature of my improvements will be best understood as described in connection with the drawings, in which they are illustrated as embodied in what I consider to be their best and most convenient form, and in which—

Figure 35:
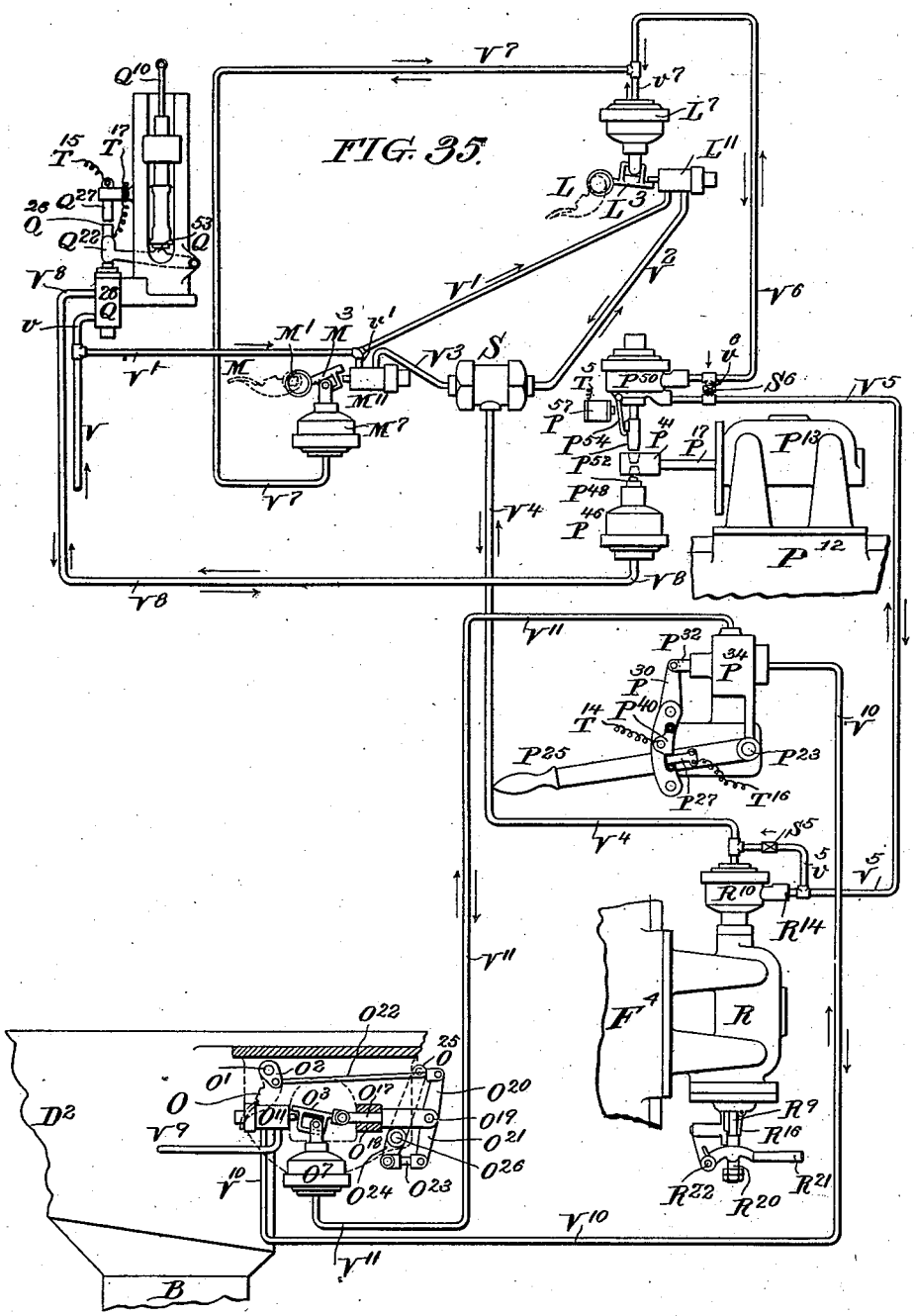

Figure 1 is a side elevation of my receiving and sending apparatus. Fig. 2 is a similar elevation taken from on a section plane passing through the tubular parts of the apparatus. Fig. 2ª is a cross-section on the line 16 16 of Fig. 2. Fig. 3 is an end elevation showing the block or head which closes the end of the receiving-tube when in normal receiving position, together with operative devices immediately connected with such head. Fig. 4 is a section through this head, taken on the section-line 1 1 of Fig. 3. Fig. 5 is a section through the head, taken on the section-line 2 2 of Fig. 4 and shown on an enlarged scale. Fig. 6 is a view, on a smaller scale, similar to that of Fig. 5 and illustrating a change in the position of the contact-needles which form the selecting devices of the apparatus. Fig. 7 is an end view of a portion of the receiving apparatus viewed from the right-hand side of Fig. 1 and illustrating particularly the mechanism for actuating the delivery-gate. Fig. 8 is a front view, on an enlarged scale, of parts shown at the upper left-hand portion of Fig. 7, Fig. 9 being a side elevation of the same parts and Fig. 10 a plan or top view of the same. Fig. 11 is an end elevation viewed from the right-hand side of Fig. 1, showing the delivery-gate and more particularly the finger and connected apparatus actuated by the escape of a carrier through this gate and by means of which the motor actuating the receiver is caused to shift it back to receiving position and by means of which also the lock or one of the locks controlling the movement of the sending device is withdrawn. Fig. 12 is a side elevation taken on the section-line 3 3 of Fig. 11. Fig. 13 is a section taken on the line 4 4 of Fig. 11 through the devices operating in direct connection with the finger. Fig. 14 is an end view looking up from the bottom of the receiving device as shown in Fig. 1, showing the opening or passage through which the carrier leaves the receiver for transmission to another station, the view showing the finger and finger-actuated mechanism partly in section and showing also the mechanism for effecting the manual control of the movements of the receiver irrespective of the selecting devices. Fig. 15 is a side view of the same mechanism, and Fig. 16 an enlarged view, shown in section, on the line 6 6 of Fig. 14 of the finger and the mechanism operating in direct connection therewith. Fig. 17 is a side elevation of the valve mechanism operating in connection with the motor which moves the receiver. Fig. 18 is a sectional view of this valve mechanism, taken on the line 8 8 of Fig. 17. Fig. 19 is a plan view showing the sending device, the motor directly operating upon the same with its valves, locking devices, and motor-actuating lever. Fig. 20 is an enlarged plan view of the valve mechanism, the locking devices and connections being shown in section. Fig. 21 is a sectional view taken on the line 9 9 of Fig. 20. Fig. 22 is a sectional plan view of the dash-pot stop which I prefer to use in connection with my receiving mechanism. Fig. 23 is an elevation showing, on an enlarged scale and from the opposite point of view, a damper mechanism illustrated in Fig. 2. Fig. 24 is an enlarged view, partly in section, of the actuating-lever for the sender device and its immediate connections. Fig. 25 is a cross-section on the line 10 10 of Fig. 24. Fig. 26 is a plan view, partly in section, showing the finger situated in the tube on the delivery side of the sending apparatus and its immediate coöperative connections. Fig. 27 is a side elevation of the same mechanism. Fig. 28 is an elevation showing, on an enlarged scale, the time-escapement device, a valve used in connection therewith being shown in section. Fig. 29 is a sectional elevation taken on the line 12 12 of Fig. 28. Fig. 30 is an enlarged sectional plan view of the devices for controlling the manual operation of the receiver, the section being taken as on the line 13 13 of Fig. 31. Fig. 31 is an elevation of the devices viewed as on the section-line 14 14 of Fig. 30, and Fig. 32 is a section taken on the line 15 15 of Fig. 31. Fig. 33 is a section through the automatic valve-chamber S shown in Fig. 1. Fig. 34 is a diagrammatic plan showing the electrical connections embodied in the apparatus. Fig. 35 is a diagrammatic plan showing the electrical connections embodied in the apparatus, and Fig. 36 is a view in the nature of a diagrammatic elevation, illustrating a modification of my apparatus and the way in which its leading features are adapted for use with apparatus differing widely in detail from that shown in my preferred form of construction.

A indicates the conduit-tube leading into a substation, for instance, in which the receiving and sending apparatus is situated. B indicates the conduit-tube leading from this substation, and C, Figs. 1 and 2, is the delivery-conduit into which carriers are forced at the substation.

D is a cylindrical face-plate, within and fitting against which moves the drum E′, pivoted through trunnion-like extensions E on braces $d$ $d$, &c., and incorporating the receiving-tube, (indicated at E².) As shown, an air-conduit D′ (see Figs. 2 and 2ª) extends around from the top of the face-plate D to the point where the conduit-tube A opens through the face-plate, the conduit D′ being continued, as indicated at D², to a junction with the head of the conduit-tube B, A′ and B′ indicating slotted constructions at the ends of the tubes A and B, whereby they are both placed in connection with the conduit D², the construction being such that under normal conditions the air passes freely from the tube A, through conduit D², into tube B. At the top of the face-plate D is a passage D³, connected with a source of air under pressure, preferably by leading into the air-conduit D′, and lying directly opposite a passage D⁵ in the face-plate, which passage registers with the tube of the sending apparatus and through it with the tube B.

D⁴ indicates simply a passage, normally closed, by which the operator can have access to the passage D³ and to the receiving-tube E² when in registry with said passage.

D⁶ is an opening leading from the face-plate D at a point lying opposite to the passage or opening D⁷, which registers with the receiving-platform C. This passage D⁶ may connect with any source of air under pressure; but as shown (see Figs. 1 and 2) it is connected with a pipe J³¹, leading into the passage D², as indicated at J³⁰, and provided with a cock-valve J²⁹, which is normally closed, but opened at proper times, by connections to be hereinafter described. The advantage of the valve-controlled pipe connections, such as J³¹, lies in the fact that the cock shuts off the air at all times except when it is required, and therefore a source of leakage and loss at the joints, such as that made between the passage D³ and the drum E′, is avoided. Another opening D⁸ (see Figs. 2, 4, and 5) is formed in the cylindrical face-plate D directly opposite to the point where the tube A opens through the face-plate, and this opening or passage is normally filled by a block or head to be hereinafter described.

On the framing which supports the annular face-plate D is secured, as shown, not only the braces or framing $d$ $d$, &c., which support the bearings for the drum E′, but also, as shown in Fig. 2, stops $d'$ and $d^\times$, the function of which will be described later on, and I further prefer to secure to this framing, as shown in Figs. 1 and 2, a crane-arm pivotally connected, as indicated at $d^2$, having on its upper side a track (indicated at $d^3$) upon which runs and is supported a trolley-wheel $d^4$, having depending from it arms $d^5$, upon which is suspended (see Figs. 3 and 4) the block or head G, the suspension being made through a lug G³⁵ or in any other convenient way, which will practically balance the head and its attached connections on the rods $d^5$, the arrangement being such that the head when loosened from the frame can be run backward out of the passage D⁸, and then by turning the crane-arm on its pivot moved to one side. By this simple device I am enabled to handle the heavy head and connections with the least possible trouble or danger of injury to its somewhat-complicated connections.

At $d^8$, Fig. 4, I have indicated the general character of packing device which I prefer to employ around the openings in the cylindrical face-plate D, and between it and the drum E′ and at $d^6$, Fig. 2, I have indicated an air connection leading from the conduit D² into the lower portion of the passage D⁵, where it opens, as indicated at $d^7$, and by means of which air is admitted above the sender-tube.

The drum E′, which, as already stated, carries the receiving-tube E², is, as shown, (see Fig. 2,) connected with the trunnions E by means of arms $e'$.

E³ indicates an opening leading from the rear of the tubular receiver E² and connected with an opening E⁴, leading through the periphery of the drum at a point ninety degrees from the end of the tube E² by means of a pipe connection E⁵, in which is situated a non-return valve E⁶, the opening of which is regulated by means of a set-screw E⁷. The purpose of this connection and valve is to permit a certain amount of air compressed in front of an entering carrier to escape into the passage D⁵, the amount being regulated by the adjustment of the set-screw E⁷. Another attachment to the drum E′ is the crank-pin E⁸, (see Fig. 1,) to which is connected, preferably by a slotted head F, the rod F′, pivotally attached at its other end to the sliding cross-head F², said cross-head (see Figs. 1, 8, and 9) sliding in a vertical fixed guideway F⁵ and being actuated by the piston-rod F³, connected with the piston (not shown) of the vertical cylinder F⁴, said vertical cylinder being in this construction the motor which actuates the receiver.

F⁶ (see Figs. 8 and 9) is a catch-recess formed in the sliding cross-head F² and adapted to be engaged under proper conditions by the hook J⁵.

F⁷ is a finger projecting from the rear of the cross-head F² and adapted to engage, as will be hereinfter described, with the forked end of the lever I¹³.

$f^5$ (see Figs. 1, 7, 8, and 9) is a laterally-projecting finger normally engaged by the hook J², the finger being secured, as shown, to the top of the guideway F⁵.

J (see Figs. 1, 7, 8, and 9) is a second or supplementary cross-head moving on the same guideway F⁵ as the cross-head F². In this cross-head is pivoted the rock-shaft J′, on the end of which is secured the hook J², the parts being attached together in such a way that a rotation of the rock-shaft to the left will move the hook outward, while at the same time the hook has sufficient play on the rock-shaft to enable it to be moved independently thereof in order to engage the finger $f^5$. This in the construction shown is effected by mounting the hook $J^2$ loosely on shaft J and securing it to said shaft by a spring $J^3$, which at one end is fastened to the hook, as by a screw $j^2$, and at the other end to the back of hook $J^5$ by screws $j^5$, said hook $J^5$ being rigidly secured to shaft $J'$. In the normal position of the apparatus the hook $J^2$ is engaged with the finger $f^5$, as shown in Figs. 1, 8, and 9.

$J^4$ is a lever-arm attached to the rock-shaft $J'$, and $J^5$ is a hook, also attached to the rock-shaft and normally lying in the position best shown in Fig. 9—that is to say, its hooked end in registry with but not in engagement with the recess $F^6$ of the cross-head $F^2$. $J^6$ is another lever-arm projecting upward from the rock-shaft $J'$ and serving, as will hereinafter be explained, as a stop or latch.

$J^7$ is a lug secured on the upper part of the guideway $F^5$ and serving to support one end of a spring $J^8$, the other end of which is attached to the lever-arm $J^4$.

$J^9$ $J^9$ are arms projecting outward from the face of the cross-head J and serving, as shown, to support the adjustable centers $j^9$ $j^9$, upon which is pivoted the latching-dog $J^{10}$, the function of which is to engage the stop-lever $J^6$ and hold it in the position indicated in Fig. 9, an upward motion of the latching-dog releasing the stop-lever $J^6$ and permitting the spring $J^8$ to rotate the shaft $J'$ to the left, simultaneously engaging the hook $J^5$ with the recess $F^6$ and disengaging the hook $J^2$ from the finger $f^5$, with the result of coupling the cross-heads F and J together. The distance to which the locking-dog $J^{10}$ is permitted to move upward can be nicely regulated by the devices shown in Figs. 8 and 9, an upwardly-projecting finger $j^{10}$ coming in connection with the inclined point of an adjusting-screw $j^{11}$, screwing into an outwardly-projecting lug $J^{11}$ on said cross-head.

$J^{12}$ is a plate secured to the top of the cross-head J, and to which in turn are secured the electromagnets $J^{13}$ $J^{13}$, the poles of which are arranged, as shown, to act upon the locking-dog $J^{10}$ as an armature, so that the magnets when energized will lift this dog, the fall of the locking-dog to normal operative position being effected by its weight, preferably aided by a spring, such as $J^{19}$.

$J^{14}$ is a rearwardly-projecting arm attached to the cross-head J and formed with a circular opening, through which passes the vertical rod $J^{17}$, the upper end of which rod is supported and guided in a bearing $J^{15}$, while the lower end of the rod is guided in a stationary bearing $J^{16}$. (See Fig. 7.)

$J^{18}$ indicates an adjustable stop conveniently made, as shown, in the form of a nut screwing on the rod $J^{17}$ and adapted to be engaged by the arm $J^{14}$. Lower down on the rod $J^{17}$ is another stop, (indicated at $J^{19}$, Fig. 7,) and below it the upper and lower parts of the rod are connected through a horizontally-grooved block $J^{20}$.

$J^{23}$ (see Figs. 1 and 7) is a horizontally-extending finger lying immediately below and in position to engage with the end of the lever-arm $J^4$. This finger is pivoted on the stud $J^{22}$, attached to a stationary lug $J^{21}$, and is normally held in its horizontal position and against the stop by the action of a spring $J^{24}$. The function of this finger is to effect a disengagement of the cross-heads $F^2$ and J, and it accomplishes this on their upward movement, the end of the lever $J^4$ on the downward movement of the cross-heads pushing the finger down in front of and permitting it to snap back to its horizontal position, in which it engages the lever $J^4$ when the cross-heads are moving up, rotating the rock-shaft $J'$ to the right, disengaging the hook $J^5$ and engaging the stop-lever $J^6$ with a locking-dog $J^{10}$. It also of course restores the hook $J^2$ to position to engage with the latch or finger $f^5$, which it does when the cross-head reaches its uppermost position.

The slotted block $J^{20}$, secured in or to the rod $J^{17}$, engages with a pin in the end of a lever-arm $J^{26}$, (best shown in Figs. 1 and 7,) said lever-arm being attached to a rock-shaft $J^{27}$, moving in bearings supported by the arms $H^7$, $H^8$, and $H^9$, Figs. 1 and 7, and connected at one end with the cock $J^{29}$, controlling the admission of air through the pipe $J^{31}$, already described.

$K^5$, Figs. 1 and 7, is a lever-arm attached to the rock-shaft $J^{27}$ and connected by a rod $K^4$ and an adjusting-screw $K^3$, (best shown in Fig. 11,) with a sliding gate K, which normally closes the delivery-passage, but when moved brings an opening $K'$ into registry with the delivery-passage and at the same time brings a stop $K^2$ in position to engage with a stop, as $K^7$, on the drum $E'$, so as to arrest it when the receiving-tube is in registry with the openings.

It will be observed that when the motor is actuated to draw the cross-head $F^2$ downward and to cause after a slight pause due to the slot connection between the pin $E^8$ and the rod $F'$ the rotation of the receiving-tube the head J will not be affected unless previously the electromagnets $J^{13}$ have been energized and the two cross-heads coupled together. If therefore the head $F^2$ moves alone, the movement of the receiver will be through an arc of ninety degrees, bringing the receiving-tube into registry with the transmission-opening $D^5$. If, however, the electromagnets $J^{13}$ are energized, the two heads will be coupled together, as already described, and the backwardly-projecting finger or arm $J^{14}$ on the upper head will move downward on the rod $J^{17}$ until it comes in contact with the stop $J^{19}$, whereupon it will draw the rod $J^{17}$ down with it and through its slotted block $J^{20}$, the lever-arm $J^{26}$, rock-shaft $J^{27}$, and lever-arm $K^5$ draw the gate K inward, so as to open the delivery-passage $D^7$ and bring the stop $K^2$ in position to engage a stop on the receiver-drum, which stop is indicated at $K^7$. The result is to arrest the movement of the receiver in registry with the delivery-port and at the same time by opening the cock $J^{29}$ to admit air to the rear of the receiver in order to blow the carrier into the receiving-platform C.

In order to avoid shocks in arresting the motion of the receiver, I prefer to make the stop (indicated at $K^7$) in the nature of a dash-pot, a convenient construction being that shown in Fig. 22, which illustrates a double-headed dash-pot arrangement adapted to take up the momentum due to the movement of the receiver in either direction, the stop in one direction coming in contact either with the stop-lug $K^2$, just described, or with the fixed stop $d^\times$, (see Fig. 2,) while in the backward movement of the receiver the stop comes in contact with the fixed stop $d'$. The stop in my preferred construction, as shown in Fig. 22, consists of a cylindrical casting, secured to the drum by a threaded stud $K^6$, which is preferably made hollow, as indicated at $k^6$, and connected by a convenient conduit with a receiver of oil or other suitable fluid, so that the cylinder $K^7$ will be always kept full. A cylindrical passage provided with a stuffing-box, as indicated at $K^8$, is formed at one end of the cylinder, while the other end is closed by a plug $K^9$, having in it a cylindrical passage provided with a stuffing-box $k^9$. Rods $K^{12}$ $K^{12}$ moving in the cylindrical passages have attached to their outer ends heads $k^{12}$ $k^{12}$. The lower rod $K^{12}$ is secured by means of a pin $K^{11}$ to a cylinder $K^{10}$, open at top and having a transverse passage $k^{10}$ in its lower portion, said passage connecting through a valve-controlled port with a valve-box $K^{13}$, in communication through openings $k^{13}$ with the interior of the cylinder $K^{10}$, and said port provided with a valve $K^{14}$, which opens to permit fluid to pass from the transverse passage $k^{10}$ and through it into the cylindrical box $K^{10}$, but closes against the passage of fluid in a reverse direction. Fastened by means of a pin $K^{17}$ to the upper rod $K^{12}$ is the cylindrical box $K^{16}$, which fits in the cylindrical opening of the box $K^{10}$, as shown, and is provided with a downwardly-extending tube $K^{18}$, in communication through a passage $k^{16}$, formed in the upper end of the box $K^{16}$, with the interior of the cylinder $K^7$.

$K^{15}$ indicates a tapered or conical rod secured to the top of the valve-box $K^{13}$ and projecting into the tube $K^{18}$.

$K^{19}$ is a spring serving to keep the boxes $K^{16}$ and $K^{10}$ pushed apart and in contact, respectively, with the top and bottom of the cylinder $K^7$. It will be observed that pressure on either of the heads $k^{12}$ will press the attached box inward and that the only escape for the fluid contained in the two boxes is through the tube $K^{18}$ and passage $k^{16}$. Consequently the escape of fluid from the boxes finds increasingly greater resistance as the tubular spindle $K^{15}$ passes through into the tube $K^{18}$, and the force of any blows struck on either end of the dash-pot stop is thus gradually taken up. On the release of pressure consequent on a movement of the receiver in either direction the spring $K^{19}$ forces the coupled boxes apart, and the admission of fluid to the interior of these boxes is facilitated by the valve-box and valve $K^{13}$ and $K^{14}$, which permit the fluid to flow freely from the cylinder $K^7$, through port $k^{10}$, valve-box $K^{13}$, and passages $k^{13}$, into the interior of cylindrical box $K^{10}$. I have shown and described this particular dash-pot stop as a convenient and especially well adapted one for my apparatus; but it will be recognized that it is capable of great variations in construction within the well-known principles of construction of dash-pots, and in the claims referring to it I do not wish to be understood as restricting myself to the particular construction shown further than is called for by the terms of the claims.

I have already referred to the block or head G, which in operative position is secured in the opening $D^8$. This device and its connections are best shown in Figs. 1, 3, 4, 5, and 6. It is conveniently provided with lugs, as shown in Fig. 5, to facilitate its attachment to the framing of the face-plate D by means of bolts $G'$. When in position, its face practically registers with the face of the face-plate D, and its said face is preferably constructed, as shown, with two openings $G^2$ and $G^3$ for the escape of air under certain conditions and with two other openings $G^4$ and $g^4$, which are threaded and into which screw the box-holding heads $G^{19}$ and $g^{19}$. The air-escape opening $G^2$ leads backward through the head, connecting through a cylindrical piston-valve seat $G^5$ with the chamber $G^7$, the rear of which connects through a cylinder $G^6$ with the chamber $G^8$, the chamber $G^7$ further connecting through a lateral passage with an exhaust-pipe $I^{21}$ and the chamber $G^8$ connecting through a lateral passage with a pipe $I^{22}$, which pipe connects (see Fig. 2) with the air-conduit $D'$ or with any other part of the system in which the pressure is the same as in the pipe A. The pipes $I^{21}$ and $I^{22}$, as shown, pass through an opening $g^2$ in the side of the block G, and it will be understood that these pipe connections must be uncoupled when it is desired to remove the block.

$G^9$ is a piston-valve, and $G^{10}$ a piston, both connected with a stem $G^{11}$, which extends backward through the head of the chamber $G^8$ and connects with a stem $G^{12}$. This stem passes backward through a bearing $g^{13}$ in a cross-bar $G^{13}$, and between this cross-bar and a collar on the valve-rod is placed a spring $G^{14}$, acting to force the valve-stem, together with the valve $G^9$ and piston $G^{10}$, backward or toward the left in Fig. 5.

$G^{15}$ is an upwardly-projecting hook-ended arm secured to the rod $G^{12}$ and shown in Figs. 4 and 5. In normal position this hook is engaged with a hook $I^{18}$, as shown in Fig. 4, with the result of holding the valve-stem and its attached pistons in the position shown in Fig. 5. At the rear of the hook $G^{15}$ the valve-stem is enlarged and passes through a fixed support $H'$, a slot $g^{16}$ being made in this portion of the valve-stem, through which slot a pin $h'$ passes for the purpose of preventing any rotation of the valve-stem at its extreme rear end. The valve-stem is formed with a vertical slot $G^{16}$, into which projects the end of the arm $I^3$ of the bell-crank levers $I^3 I^4 I^5$. The hooked end $I^{18}$ (best shown in Fig. 4 and referred to as engaging the hook $G^{15}$) passes through a bearing $h^2$, formed at the lower end of a bracket $H^2$, and is connected with a vertical rod $I^{17}$, having also a bearing at the top of said bracket. On this rod are situated stops $i^{17} i^{17}$, against the upper one of which abuts a spring $I^{19}$ and against the lower one of which abuts a spring $I^{20}$, said springs both abutting against a sliding head $I^{16}$, connected by means of links $I^{15}$ with the arm $I^5$ of the double bell-crank lever $I^5 I^4 I^3$, which is pivoted, as shown, on a bracket $H^3$. In the normal position of this double bell-crank lever its arm $I^5$ exerts a pressure upward against the spring $I^{19}$, thus tending to force the rod $I^{17}$ and its hooked end $I^{18}$ upward, a tendency which is resisted by the engagement of the hooks $I^{18}$ and $G^{15}$, but which is free to exert itself as soon as the hook $G^{15}$ is moved backward to disengage it.

The parts connected with the air-passages $G^2$ have now been sufficiently described to enable their initial operation to be understood. The valve $G^9$ and its connected parts in the position shown in the drawings are held there by the engagement of the hooks $G^{15}$ and $I^{18}$ against the pressure exerted by the spring $G^{14}$, the air-pressure on the outer faces of the piston-valve $G^9$ and the piston $G^{10}$ being the same. On the entry of a carrier into the tubular receiver $E^2$ the air in front of it is compressed and increased in pressure and acting on the face of the valve $G^9$ forces said valve and the stems $G^{11}$ and $G^{12}$ outward, releasing the engagement of the hooks $G^{15}$ and $I^{18}$ and permitting the spring $I^{19}$ to lift the hook $I^{18}$ upward out of the plane in which it would engage the hook $G^{15}$. The increase of pressure is but momentary, and as it falls either by the escape of air, as through the pipe $E^5$, or by a recoil movement of the carrier the force of the spring $G^{14}$ pushes the valve-stem inward until the valve $G^9$ leaves its seat $G^5$, opening a free passage of air from $G^2$ into chamber $G^7$ and through it to the exhaust-pipe $I^{21}$, whereupon, of course, the pressure in the rear of the carrier will cause it to move close up to the face of the block or head G. My purpose in providing the piston $G^{10}$ and connecting the chamber $G^8$ in its rear with the air system of the conduit-tube is to provide against irregularities in the action of the valve-opening device due to inequalities in the pressure in the system; otherwise, of course, the spring $G^{14}$ could be relied upon to effect the action of the valve. I wish, further, to note that while the arrangement and particular construction of the devices for opening the exhaust-passage $G^2$, as shown in the drawings, are effective and satisfactory I do not desire to limit myself on this special construction, as it is, I believe, new with me to provide an exhaust-valve in the head G which is normally shut and which is opened by the pressure of air induced by the entry of a carrier into the receiver irrespective of the particular construction of the valve mechanism.

The resetting of the valve $G^9$ in closed position is effected by the downward movement of the cross-head $F^2$, the finger $F^7$ of which in its normal uppermost position is engaged in the crutch of the forked lever $I^{13}$, which lever is secured to a rock-shaft moving in the bearing-sleeve $H^6$ and having attached to it another lever-arm $I^{12}$, (see Figs. 3 and 4,) which by means of a connecting-rod $I^{11}$ is connected with the arm $I^4$ of the lever $I^4 I^5 I^3$, the connection, as shown, being an indirect one, the rod $I^{11}$ being connected at $I^8$ with one arm of the pivoted lever $I^7 I^6$ and a short connecting-rod $I^{10}$, pivotally connected at $I^9$ to the lever-arm $I^7$, and at its other end to the lever-arm $I^4$. This indirect connection, however, is merely incidental and for all purposes having relation to the operation of the valve $G^9$ the rod $I^{11}$ might just as well be connected directly with the lever-arm $I^4$. It will readily be seen (see Figs. 1, 3, and 4) that the downward motion of the cross-head $F^2$, acting through the connection above described, will move the lever-arm $I^3$ to the right, and this lever-arm projecting into the slot $G^{16}$ at the end of the valve-rod $G^{12}$ will draw the rod and the valve attached to it toward the right. At the same time the connected lever-arm $I^5$ moves downward, drawing down the sleeve-abutment $I^{16}$ and, through the spring $I^{20}$, drawing the rod $I^{17}$ and the hook-head $I^{18}$ downward until the said hook-head extends below the hook $G^{15}$, which it engages as soon as the finger $F^7$ ceases to act upon the forked lever $I^{13}$ and permits it and its connected parts to return to normal position, which is somewhat below its uppermost position when held up by finger $F^7$.

As shown in the drawings, I provide another exhaust-passage $G^3$ in the face of the head G, which passage is normally closed by the valve $G^{17}$, (see Figs. 3 and 4,) a valve-rod $G^{18}$ being provided which at its outer end connects with a lever-arm $I'$, secured in turn to a rock-shaft moving in the bearings $H^5 H^5$ and having a hand operating-lever I also attached to it, $I^2$, Fig. 3, indicating a spring set so as to normally hold the valve $G^{17}$ to its seat. It will be understood that this valve is in no sense automatic and is opened only by the operator moving the lever-arm I.

The sleeve-studs $G^{19}$ $g^{19}$, which screw into the perforations $G^4$ $g^4$ in the face of the head G, (see Fig. 5,) are each made with a central perforation, in which perforations insulating-blocks $G^{20}$ $g^{20}$ are secured. In these sleeve-studs are supported so as to move freely tubes or cylinders $G^{21}$ $g^{21}$, having, preferably, a lining of insulating material $g^x$, both of such tubes being secured at their ends to threaded perforations $G^{23}$ $g^{23}$ in the head $G^{22}$, the said head being connected with a rod $G^{24}$, supported in a cross-brace $G^{25}$, against the outside of which brace rests, as shown, a spring-bearing $G^{26}$, through which the rod $G^{24}$ moves freely, another spring-bearing $G^{27}$ being secured, preferably in an adjustable manner, on the outer part of the rod and a spring $G^{28}$ being placed between the said bearings, the function of which is to exert its force to draw the rod and its connected head $G^{22}$ and the parts connected therewith backward or toward the right, as shown in Fig. 5. To the outer end of the rod $G^{24}$ is pivotally secured the lever-arm $I^6$ of the lever $I^6$ $I^7$, (see Figs. 1, 3, and 4,) and it will be obvious from what has already been described that the downward motion of the head $F^2$, acting on the forked lever $I^{13}$ and through the already-described connections with said forked lever, will move the lever-arm $I^6$ toward the right, as shown in Fig. 4, moving the rod $G^{24}$ and the connected cylinders $G^{21}$ $g^{21}$ in the same direction, also that the force of the spring $G^{28}$ will hold such parts in their retracted position until some force is exerted to again move them in the opposite direction, and I would further call attention to the fact that by reason of the slotted connection between the rods $F'$ and the crank-pin $E^8$ (see Fig. 1) the downward movement of the head $F^2$ effects or permits of this retraction of the cylinders $G^{21}$ $g^{21}$ in advance of any movement being communicated to the drum $E'$.

Except in the means for moving the rod $G^{24}$ and its attachments the device does not differ materially from that shown and described in my prior patent, No. 595,755, of December 21, 1897. I secure to the rod $G^{24}$ a laterally-projecting arm $G^{29}$ and to said arm by means of an insulating-bushing $g^{29}$, and immediately in the rear of the cylinder $G^{21}$ I secure a binding-post $G^{30}$, having spring-fingers $g^{30}$ and a connection with an electric wire $T^6$, to be hereinafter described. Through each of the cylinders $G^{21}$ $g^{21}$ extends a rod or finger $G^{31}$ $g^{31}$, the front ends of which project through the insulating-bushings $G^{20}$ $g^{20}$ and extend out in front of the head G, as shown, their forward position being fixed by the stop-heads $G^{32}$ $g^{32}$, which are attached to the rods and normally pressed forward or toward the left in Fig. 5 by the springs $G^{33}$ $g^{33}$, the rear ends of which springs rest against the conducting-heads $G^{34}$ $g^{34}$, which heads serve as the rear bearings for the rods and which, as shown, connect with the circuit-wires $T'$ and $T^{12}$. It will be readily understood that by reason of the action of the spring $G^{28}$ on the rod $G^{24}$ the cylinders $G^{21}$ $g^{21}$ are normally retracted to an extent which withdraws the front ends of the rods $G^{31}$ $g^{31}$ behind the face of the head G, and this retracted position which the parts assume as soon as the head $F^2$ begins to move downward is preserved at all times during the downward-and-upward motion of the said head until at the end of the upward motion the finger $F^7$ engages the forked lever $I^{13}$ and by forcing it upward acts through the parts described to force the rod $G^{24}$ and its attached parts outward or toward the left in Fig. 5, the purpose of this construction being to insure that the rods or fingers $G^{31}$ $g^{31}$ shall not interfere with or be injured by the motion of the receiving-tube $E^2$ over the face of the head G.

As in the case of my former patent above referred to, one of the fingers or rods—that indicated in the drawings by the symbol $G^{31}$—is intended to be operated or pushed backward by all carriers entering the receiver $E^2$ and by forcing the rear end of the rod into contact with the spring-finger $g^{30}$ to close the circuit of which the wires $T'$ and $T^6$ form a part. The other finger or rod—that indicated at $g^{31}$—is in the different stations placed at varying distances from the center of the head G, selecting devices, as described in my former patent, being secured upon the carrier, so that when a carrier designed for delivery at a particular station reaches such a station the selecting device comes in contact with both the rods or fingers $G^{31}$ and $g^{31}$, thus closing the circuit of which the wires $T'$ and $T^{12}$ form a part. The circuits referred to can be best followed in the diagram Fig. 34, where the selecting device on the carrier is indicated at U and where it will be seen that the closing of the circuit of which the wires $T'$ and $T^6$ form a part sends the current of the battery T by the branches $T^4$ and $T^5$ through the electromagnets $R^{19}$ and $P^{57}$, the branches connecting through wires $T^3$ and $T^2$ to the battery. It is also apparent from the diagram that the connecting of the wires $T'$ and $T^{12}$ by means of the selecting device U sends the current of the battery T through the circuit which may be traced as follows: wire $T^{12}$, wire $T^{11}$, electromagnet $J^{13}$, wire $T^2$, through the battery to the wire $T'$. I have already described the function of the electromagnet $J^{13}$, the energizing of which by the closing of the circuit couples the sliding head J with the head $F^2$, the downward movement of the head effecting the opening of the gate leading into the discharge-conduit C and the arrest of the receiving-tube $E^2$ in registry with such gate and also opening the cock $J^{29}$, so as to admit a blast of air through pipe $J^{31}$ to force the carrier from the receiving-tube into the discharge-passage.

I have already referred to the vertical cylinder $F^4$ (see Fig. 1) as being the motor which through the rod $F^3$ actuates the sliding head $F^2$ and through it the drum and receiving-tube, as well as the cross-head J and its connected parts when said cross-head is connected with the head $F^2$. The valve and valve-actuating mechanism by which the motive fluid is introduced into these cylinders and exhausted therefrom is illustrated in Figs. 17 and 18 of the drawings, R indicating the valve-casing, which is secured on the side of the cylinder, as shown, formed with an inlet-air-pressure chamber $R^2$, which by means of the passage $R'$ is in communication with a source of fluid-pressure, which may be, of course, the main conduit of the system. On each end of the chamber $R^2$ are, as shown, formed cylindrical valve-seats $R^3 R^4$, having ports $R^5$ and $R^6$ leading from them to the top and bottom, respectively, of the cylinder and communicating at their outer ends with the exhaust-chamber $R^7$, which opens through a passage $R^8$ to the atmosphere.

$R^9$ is a valve-stem to which are attached piston-valves moving in the cylindrical seats described and adapted, as shown, to open them alternately to the pressure-chamber and the exhaust-chamber. At the top of the valve-box is situated a cylinder $R^{10}$, in which moves a piston $R^{11}$, connected with the top of the valve-stem, a spring $R^{12}$, acting to normally force the piston of the valve-stem upward or into the position in which the lower end of the cylinder is in communication through the port $R^6$ with the exhaust. A port $R^{13}$ leads into the top of the cylinder $R^{10}$ and is connected through a conduit system, to be hereinafter described, with a source of fluid-pressure which when open presses the piston $R^{11}$ downward in the cylinder to and below the position shown in Fig. 18, in which lowermost position it uncovers a lateral passage $R^{14}$, through which the pressure fluid in the cylinder escapes into another conduit, where it is utilized for performing other functions. To the lower end of the valve-stem $R^9$ is secured a head $R^{15}$; a shoulder $r^{15}$ at the top of said head serving to engage a latch $R^{16}$, normally drawn in toward the valve-stem by the action of a spring $R^{18}$ and when engaged with the shoulder $r^{15}$ serving to hold the valve-stem and its connected parts in the position shown in Fig. 18. The outward movement of the latch is regulated, as shown, by a set-screw $R^{17}$, and its disengagement with the shoulder $r^{15}$ is, as shown, effected by the electromagnet $R^{19}$. I have shown the head $R^{15}$ as formed with an enlargement $R^{20}$ at its lower end and situated between the forks of a hand-lever $R^{21}$, pivoted at $R^{22}$ and acted on by spring $R^{24}$, which normally holds it upward and out of contact with the enlargement $R^{20}$. When pressed downward by the hand, lugs $R^{23}$ on the lever come in contact with the enlargement $R^{20}$ and draw the rod $R^9$ downward, thus enabling it to be engaged with the latch $R^{16}$ at will, as well as by the action of the cylinder $R^{10}$.

I have already pointed out the fact, and the means by which it is effected, that the electromagnet $R^{19}$ is energized by the impact of each carrier entering the tube $E^2$ upon the finger $G^{31}$. Consequently it will be seen that on the entrance of each carrier into the receiver the latch $R^{16}$ is withdrawn, leaving the valve-rod $R^9$ under the direct influence of the spring $R^{12}$, which at once raises it, admitting motive fluid to the top of the cylinder $F^4$ and permitting it to exhaust from the bottom of said cylinder. The piston in the cylinder is therefore drawn downward, drawing with it the head $F^2$, which in turn rotates the receiving-drum either, as shown, through an arc of ninety degrees, bringing the receiving-tube into registry with the transmission-opening $D^5$, or in case the selecting device U is also operative to an arc of forty-five degrees bringing the receiving-tube into registry with the discharge-opening $D^7$. In every position the exit of the carriers from the receiving-tube results, through mechanism which I am about to describe, in the admission of pressure fluid to the cylinder $R^{10}$, which, acting on the piston $R^{11}$, returns the valve to the position shown in Fig. 18, where it is engaged and held by the latch $R^{16}$.

Situated in the rear of the discharge-opening $D^7$ is a finger L, which projects into the discharge-passage, so as to be engaged by a carrier passing into the same, and which, with its connected mechanism, is best shown in Figs. 11, 12, and 13. The finger is secured to a rock-shaft $L'$, upon which a spring $l'$ acts to normally hold it in the position shown in Figs. 11 and 12. Also secured to this rock-shaft is the eccentric $L^2$, to which by means of an eccentric-strap $L^4$ is connected a rod $L^3$, having a slotted extension $L^5$ on its upper side and having, preferably, its outer end $L^6$ formed with a recess or slot, as indicated at $l^6$ on its upper face. $L^7$ is a cylinder in which moves a piston $L^8$, connected by a piston-rod $L^9$ and a pin at the end of said rod with the slotted extension or shoulder $L^5$. A spring $L^{10}$ serves to normally press the piston and piston-rod upward. Situated in front of or toward the right of the end of the bar or rod $L^3$ is a valve-box $L^{11}$, having formed in it two chambers $L^{12} L^{13}$, connected by a valve-seated passage $l^{12}$. Passing through the chambers $L^{12}$ and $L^{13}$ is a valve-rod $L^{14}$, which projects through the box at the left-hand end, so as to be in line with the end $L^6$ of the bar $L^3$ when said bar is in its upper position. A valve is secured, as shown, to this stem, which normally closes the port $l^{12}$, a spring $L^{15}$ serving to press the valve and its stem toward the left. At the right-hand side of the valve the valve-stem is made hollow, as indicated at $L^{16}$, and projects into an opening $l^{13}$ at the right-hand end of chamber $L^{13}$, lateral perforations $l^{16}$ serving, in the position shown in Fig. 13, to place the chamber $L^{13}$ in communication with the atmosphere through the hollow valve-stem $L^{16}$; but these lateral perforations are closed as soon as the valve-stem is moved toward the right. A finger M, practically identical in its construction and connections with the finger L, and the similar connected parts of which (see Figs. 14, 15, and 16) being designated with the letters M and $m$, with numerals similar to those applied to the letters L and $l$, need not be further described, is situated in the transmission-passage leading from the opening $D^5$ with which the receiver registers for the transmission of the carrier.

To understand the action of the fingers above described, it will be desirable to refer first to the air-pipe connections shown in Fig. 35, in which a pipe V, leading from a source of fluid-supply, which may conveniently be the transmission-tube, connects through a pipe V' directly with the chamber $L^{12}$ of the valve-box $L^{11}$ and also through a branch $v'$ with the chamber $M^{12}$ of the valve-box $M^{11}$, from which connection it will be obvious that the chambers $L^{12}$ and $M^{12}$ are at all times charged with the pressure fluid. The chambers $L^{13}$ and $M^{13}$ are connected through pipes $V^2$ and $V^3$ with a pipe $V^4$, which leads into the top of the cylinder $R^{10}$. The connection between the pipes $V^3$ and $V^2$ and the pipe $V^4$ is through an automatic valve-box S, in which, as shown in Fig. 33, is a loosely-moving piston S', the function of which is to cut off connection between the pipes $V^2$ and $V^3$, while permitting either of them to connect with the pipe $V^4$.

To follow the conduit connection further, the lateral passage $R^{14}$, described in connection with Figs. 17 and 18, connects the interior of the cylinder $R^{10}$ with pipe $V^5$, which connects in turn through a cylinder $P^{50}$, as shown in the drawings and which need not at present be described, with a pipe $V^6$, which pipe connects through a branch $v^7$ with the end of the cylinder $L^7$ and through a branch $V^7$ with the end of the cylinder $M^7$. $v^5$ and $v^6$ indicate branch connections around the cylinders $R^{10}$ and $P^{50}$, in which are situated non-return valves, (indicated at $S^5$ and $S^6$,) the function of which is to permit a free passage of fluid in the direction indicated by the arrows, but to close the branches against motion of the fluid in the other direction.

To follow the operation of the described mechanism, we will suppose the case of the carrier escaping through the delivery-passage $D^7$, which comes in contact with the finger L, pressing it toward the right and by turning the eccentric $L^2$ draws the bar $L^3$ toward the left until its end $L^6$ is drawn from beneath the end of the valve-stem $L^{14}$, against which it has been resting, whereupon the spring $L^{10}$ raises the bar $L^3$, bringing its end $L^6$ directly opposite to the end of the valve-stem, and of course the action of the spring simultaneously raises the piston $L^8$ in the cylinder $L^7$. As soon as the carrier has passed beyond the finger the spring L' rotates the finger and the eccentric secured on its shaft back to the original normal position, forcing the bar $L^3$ toward the right and against the end of the valve-rod $L^{11}$, which is pushed to the right, raising the valve secured to the stem from its seat and opening the port $l^{12}$, thus placing the chambers $L^{12}$ and $L^{13}$ in communication, the motion of the valve-stem also closing the connection of the chamber $L^{13}$ with the outer air through the hollow stem $L^{16}$. The pressure-air therefore flows through conduits V and V' into pipe $V^2$ and then through a valve-box S and pipe $V^4$ into the head of the cylinder $R^{10}$, in which it depresses the piston $R^{11}$ and valve-stem $R^9$ of Figs. 17 and 18, with a result of shifting the controlling-valve of the motor-cylinder $F^4$, as has been described, and returning the receiver and receiving-drum to normal receiving position. After depressing the piston $R^{11}$ to a point somewhat beyond that shown in Fig. 18 the compressed air from the pipe $V^4$ passes from the cylinder $R^{10}$ into the lateral passage $R^{14}$ and then passes through the pipes $V^5$, $V^6$, and $v^7$ into the head of the cylinder $L^7$, pressing down the piston $L^8$ and through its stem $L^9$ pressing down the bar $L^3$ until its end L, preferably channeled on top, as described, passes below the end of the valve-stem $L^{14}$, whereupon the valve-stem at once moves toward the left, closing the connection between the chambers $L^{12}$ and $L^{13}$ and opening the connection from the chamber $L^{13}$ to the atmosphere, the parts being returned to the position shown in Fig. 13. The pipe $V^2$ (see diagram Fig. 35) is by this shifting of the valve in the box $L^{11}$ cut off from the source of pressure and placed in communication with the atmosphere, so that the compressed air in the system connected with said pipe is at once permitted to exhaust, the by-pass pipes $v^6$ and $v^5$ permitting the exhaust to take place without passing through the cylinders $P^{50}$ and $R^{10}$. The reason for this will be readily understood in connection with cylinder $R^{10}$, in which as soon as the pressure begins to fall the lateral passage $R^{14}$ is sealed by a slight upward movement of the piston $R^{11}$.

It is not necessary to describe in detail the effect of the carrier on the finger M, because the action is practically identical with that described in connection with finger L, the escape of the carrier from either the delivery-port or the transmission-port thus effecting the return of the receiver to normal position and the return of the parts described to their corresponding normal position.

I have pointed out the fact that the mechanism immediately connected with the finger M is substantially identical with that connected with finger L, as shown in the drawings. However, there is additional mechanism connected with finger M. This (see Figs. 14, 15, 30, and 31) consists, primarily, of a sleeve $M^{17}$, secured to the end of the shaft M' and upon the outer end of which sleeve is secured the handle-lever $M^{18}$. This is provided for the purpose of enabling the operator at the substation to manually set in operation the devices which are normally arranged to be actuated by the movement of the finger M.

As shown, the sleeve $M^{17}$ passes through the center of a plate $M^{19}$, secured to the frame of the machine, as indicated in Figs. 14 and 15, by stud-bolts $M^{20}$. On the outside of the tubular projection $M^{17}$ is a flanged annulus $M^{21}$, having a facing $m^{21}$ of non-conducting material, and in the inside of the tube is situated a push-button rod $M^{22}$, having a push-button $M^X$ secured onto a threaded extension $m^{22}$ of its end. The rod $M^{22}$ is connected by a pin $M^{23}$ with the annulus $M^{21}$, the pin passing through a slot $m^{17}$ in the tube and the arrangement being such that the annulus $M^{21}$ will move longitudinally with the push-button, a spring $M^{24}$ serving to push the button normally outward. Secured in the plate $M^{19}$, but insulated therefrom, as shown, by non-conducting washers, are binding-posts connected with electric circuit-wires, one, $M^{25}$, connected with the wire $T^{13}$, having a spring-terminal $M^{26}$ extending over but normally out of contact with the binding-post $M^{29}$, connected with the wire $T^{10}$. Another binding-post $M^{27}$, connected with the wire $T^{10}$, has a spring-terminal $M^{28}$, which extends over the binding-post $M^{30}$, which in turn connects with a wire $T^8$, and it will be obvious that by pressing the push-button $M^{22}$ the spring-terminals are brought into contact with the binding-posts over which they extend, connecting the wires $T^{13}$ and $T^{10}$ in the one case and $T^{10}$ and $T^8$ in the other case. Also secured to the plate $M^{19}$ are the binding-posts $M^{33}$ and $M^{34}$, connecting, respectively, with the circuit-wires $T^{10}$ and $T^9$, the post $M^{33}$ having a spring-terminal $M^{32}$, which extends over a flange $M^{35}$ of the terminal $M^{34}$ and has attached to it a push-button $M^{31}$, by which contact can be made at will, connecting the wires $T^9$ and $T^{10}$. By reference to the diagram Fig. 34 it will be seen that contact between the spring-plate $M^{26}$ and the terminal $M^{29}$ closes a circuit which may be traced as follows: wires $T^{10}$ $T'$ through battery T, wire $T^2$ and $T^{11}$ through electromagnet $J^{13}$ to wire $T^{13}$, the effect being of course to energize the electromagnet $J^{13}$, which controls, as before described, the connection between the heads $F^2$ and J. The diagram also makes it clear that contact of the terminal $M^{28}$ with the binding-post terminal $M^{30}$ closes the circuit through wires $T^{10}$ and $T'$ through battery T, wires $T^2$ and $T^3$ to the branching wires $T^4$ and $T^5$, connected in circuit with the electromagnets $R^{19}$ and $P^{57}$, then through wires $T^6$ and $T^7$ to wire $T^8$. Consequently it follows that in the construction illustrated in Figs. 14, 15, 30, and 31 the pushing end of the push-button $M^{22}$ simultaneously energizes all three of the electromagnets. The effect of pushing the push-button $M^{31}$ is also to be followed on the diagram Fig. 34, the contact of the spring-tongue $M^{32}$ with the shoulder $M^{35}$ closing the circuit through $T^{10}$ and $T'$, battery T, wires $T^2$ and $T^3$ through branches $T^4$ and $T^5$ and the electromagnet contained therein, wires $T^6$ and $T^7$ to $T^9$. In this way the two electromagnets $R^{19}$ and $P^{57}$ operate, without, however, affecting the electromagnet $J^{13}$.

I have pointed out that when the receiving-tube $E^2$ is rotated into position to register with the passage $D^3$, which connects through the box or conduit $D'$ both with the tube A and through the conduit $D^2$ with the tube B in order to insure a sufficient pressure to force the carrier out of the receiver, I provide in the conduit $D^2$ a valve or damper $N^6$, (see Fig. 2,) having connected with its pivotal shaft a lever-arm $N^5$, with which a spring is connected, as shown, to hold it normally in position to leave the conduit $D^2$ open. Connected with the pin on this lever by means of slotted head $N^4$ is a rod $N^3$, which in turn connects, as shown, with a lever N, pivoted at $N'$ and having its free end in position to be engaged by the stop $N^7$ on the receiving-drum just before the tube $E^2$ comes into registry with the passage $D^5$. It will therefore be seen that the motion of the drum at the end of its ninety-degrees movement will effect the closing of the damper $N^6$, directing the entire air-current through the passage $D^3$ into the receiving-tube. The slot $N^4$ is provided so as to enable the damper to be turned by hand when it is desired to do so. I have also shown in the lower part of the conduit $D^2$, below the branch $d^6$, leading therefrom, another damper, (indicated at $N^8$,) on the outer end of the shaft $N^9$ of which is secured a toothed segment $N^{10}$, (see Fig. 1,) which is actuated by means of a worm $N^{11}$ and provided with an indicating-finger $N^{12}$ to show the position of the damper. This regulable damper I provide so that the amount of pressure in the by-pass $d^6$ can be nicely regulated.

Between the end of the transmission-passage $D^5$, leading from the face-plate D, and the end of the transmission-tube B an opening is left for the sending apparatus, the opposing faces of the two tubular passages being indicated at P and $P'$, Figs. 1 and 2, and the receiving device, which is of similar character to that described in my former patent, No. 595,754, of December 21, 1897, being by means of lateral arms $P^3$ $P^3$, pivoted on a shaft $P^2$.

$P^5$, Figs. 1, 2, and 19, indicates the sending-tube proper, which is normally in registry with the feeding-chamber $p$, (see Fig. 1,) and $P^6$ indicates the tube of the sender, which is normally in registry with the transmission-tube B. The tubes are connected at top and bottom by face-plates $P^4$, Fig. 19, which fit against the portions P and $P'$ and against face-plates indicated at $p'$, Fig. 19, which lie flush with the said portions P and $P'$, and, as shown, there is secured to the tube $P^6$ an arm $P^7$, which by means of a connecting-rod $P^8$ is connected with a cross-head $P^9$, moving in guides $P^{10}$ and actuated by piston-rod $P^{11}$, attached to a piston moving in the motor-cylinder $P^{12}$. The movements of the piston in the cylinder $P^{12}$ are, as shown, governed by the admission of air under pressure from the valve-box $P^{13}$, which is in general character and internal construction similar to the valve-box R, already described, the air being admitted at $P^{14}$ and exhausted through $P^{15}$. (See Figs. 19 and 20.) The valve-stem $P^{17}$ has secured to it (see Fig. 21) piston-valves $P^{16}$ $P^{16}$, and to its right-hand end (indicated at $P^{18}$, Figs. 20 and 21) there is secured a fixed abutment-plate $P^{19}$, between which and a sliding grooved collar $P^{20}$ is situated a spring $P^{21}$. In the groove of the collar $P^{20}$ are situated the forked ends of a lever $P^{22}$, secured to a rock-shaft $P^{23}$, which is normally turned toward the left, as shown in Figs. 19, 20, and 21, by the action of the spring $P^{24}$. To the end of shaft $P^{23}$ is secured the sender-lever $P^{25}$, (see Figs. 24 and 25,) to the side of which is attached a latch-detent $P^{26}$ and also a spring-tongue $P^{27}$, which is connected with the circuit-wire $T^{16}$. The lever moves, as shown, through a slot $p^{28}$ in a cross-bar $P^{28}$, having at its upper end a pivot-pin $P^{29}$, upon which is pivoted the lever $P^{30}$, having at its lower end a latching-hook $P^{31}$. The upper part of the lever $P^{30}$ is connected with a piston-rod $P^{32}$ of a piston $P^{33}$, moving in a cylinder $P^{34}$, a spring $P^{35}$ serving to normally press the lever and its connected piston toward the right.

$P^{36}$ is a conduit-opening entering the right-hand side of the cylinder $P^{34}$, and connecting with the conduit $V^{10}$ and $P^{37}$ is a conduit-opening entering through the side of the cylinder in position to be uncovered by the piston in its extreme position in either direction and to which is connected the conduit $V^{11}$.

$P^{38}$ indicates an atmospheric connection with the right-hand end of the cylinder $P^{34}$. As shown in Figs. 24 and 25, there is secured on the outer face of the brace $P^{28}$ a block of insulating material, (indicated at $P^{39}$,) and upon the face of this is secured a conducting-plate $P^{40}$, connected, as shown, with a circuit-wire $T^{14}$, the spring-finger $P^{27}$ resting, as shown, either on the conducting-plate or the non-conducting block, in accordance with the position of the sender-lever. It will be obvious that when the sender-lever is raised to the position indicated in Fig. 24 it is engaged and held in that position by the hook $P^{31}$ and that in moving to its said upper position it moves, through the lever $P^{22}$, the grooved abutment-plate $P^{20}$ toward the right, either moving the valve-stem $P^{17}$ with it, which will be the case when the valve-stem is not locked, or in case the stem is locked pressing the spring $P^{21}$. It is also obvious that a movement of the piston $P^{33}$, Fig. 24, to the left will disengage the hook $P^{31}$ from the sending-lever and permit the spring $P^{24}$ to return the parts to the positions shown in Fig. 21.

Referring now to Figs. 19, 20, and 21, it will be seen that to the left-hand end of the valve-rod $P^{17}$ is secured a block $P^{41}$, formed with perforations (indicated at $P^{42}$) and moving in a guideway $P^{43}$, having perforations, as indicated at $P^{44}$ and $P^{45}$, which in normal position register with the perforations indicated at $P^{42}$. $p^{45}$ is a locking-bolt secured, as shown, directly to a piston $P^{47}$, moving in a cylinder $P^{46}$, said cylinder having in its head an opening $P^{49}$, into which connects the conduit $V^{8}$. As shown, the piston $P^{47}$ and the detached bolt $p^{45}$ are normally held in or returned to their lowermost position by their weight, which of course can be supplemented, if desired, by any coacting device. On the other side of the head $P^{41}$ is situated the cylinder $P^{50}$, in which moves the piston $P^{51}$, having a piston-rod $P^{52}$, the end $p^{52}$ of which forms a locking-bolt, and on the bolt is situated a latching-lug $P^{53}$, which when engaged by the pivoted hook $P^{54}$ holds the bolt in its disengaged position, as shown in Fig. 20. The backward movement of the hook is limited by an adjusting-screw $p^{55}$, held in a lug $P^{55}$, and the hook is normally drawn in toward the bolt in position to engage it by the action of a spring $P^{56}$, acting through a yoke $p^{56}$. The disengagement of the hook is effected by energizing an electromagnet $P^{57}$, situated in a circuit, of which the wire $T^{5}$ forms a part. The piston and bolt are normally pressed downward or into position to engage block $P^{41}$ by the action of a spring $P^{58}$, and the lifting of the piston and bolt is effected by the action of pressure fluid entering the cylinder through the opening $P^{59}$, connected with the conduit $V^{5}$, the fluid escaping from the cylinder when the piston is raised through an opening $P^{60}$, connected with the conduit $V^{6}$.

I have already explained the action of the sending-lever $P^{25}$ on the controlling-valve of the motor-cylinder of the sending apparatus. Every time the sending-lever is lifted it draws the valve to the right unless, of course, either one of the bolts $p^{52}$ or $p^{45}$ is in engagement with the head $P^{41}$, in which case the movement of the sending-lever compresses the spring $P^{21}$, maintaining a pressure on the valve-stem in a direction toward the right, which takes effect in moving the valve-stem as soon as the bolts are disengaged from the head $P^{41}$. In lifting the sending-lever the contact of the spring-finger $P^{27}$ with the contact-plate $P^{40}$ connects the circuit-wires $T^{14}$ and $T^{16}$. This connection (see diagram Fig. 34) electrically connects the spring-fingers $g^{30}$ through wires $T^{18}$ $T^{16}$ $T^{14}$ with the wire $T^{11}$, in which is situated the electromagnet $J^{13}$, so that a carrier arriving in the receiving-tube and pressing in the rod $G^{31}$, so as to bring it into contact with the spring-finger $g^{30}$, will close the circuits leading from the battery T through the electromagnet $J^{13}$ and from the battery T through the electromagnets $R^{19}$ and $P^{57}$, this connection being irrespective of the electrical connection of the rods $G^{31}$ and $g^{31}$ and causing the entrance of all carriers into the receiving-tube to effect the coupling together of the heads $F^{2}$ and J and the consequent delivery of the carrier through the ports $D^{7}$. This feature of my invention, by which the movement of a sending-lever effects the delivery of all carriers arriving while it is in that position, is an important feature of my invention, and as it and the other interlocking features between the receiving and sending apparatus are, I believe, radically new I wish it to be understood that my claims relating to these features are intended to be read in the broadest possible sense and in no wise to be limited to the special mechanical contrivances for effecting such interlocking which I have illustrated in my drawings as being those which I believe to be the best adapted for the purpose.

In addition to providing against the transmission of a carrier through a substation after the sending-lever has been set, as before described, it will be obvious that as the approach of each carrier into the receiving-tube energizes the electromagnet $P^{57}$ such approaching carrier effects the withdrawal of the latching-hook $P^{54}$, permitting the spring $P^{58}$, Fig. 20, to push the piston $P^{51}$, its rod $P^{52}$, and the bolt $p^{52}$ downward into the recess $P^{42}$ of the block $P^{41}$, thus locking the sending apparatus and preventing its movement to inject a carrier into the transmission-tube as long as this lock remains in engagement, and the period of this engagement is determined by the exit of the carrier from the receiving-tube through either the delivery or transmission port. When the carrier by acting upon either the fingers L or M, as already described, permits the flow of the high-pressure air first into the cylinder $R^{10}$ and then after it has restored the controlling-valve of the motor-cylinder $F^4$ to normal position through conduit $V^5$ into the lower portion of the cylinder $P^{50}$, where it raises the piston $P^{51}$ to a position somewhat above that in which the engagement of the hook $P^{54}$ is insured, thus withdrawing the bolt $p^{52}$, the air then passing from the conduits $V^6$ and $V^7$ to the cylinder $L^7$ and $M^7$ and after it has performed its function in these cylinders, as already fully described, is permitted to exhaust from all the motor-cylinders and connecting-pipes. From this description it will be clear that the sender is locked against movement to insert a carrier from the time a carrier enters the receiver until it has left such receiver. It is, however, desirable that the sender should remain locked during the period in which the receiver is returning to normal receiving position, and it is also desirable that provision should be made for the delivery of all arriving carriers which reach the receiver within a determined time either from the injection of a carrier by means of the sender or from the delivery or transmission of a preceding carrier, and in the specific arrangement shown I provide the bolt $p^{45}$ to serve as a supplemental locking device to effect the sender in the way described, and I effect the other purpose by the devices I am about to describe.

Referring now particularly to Figs. 1, 28, and 29, supplemented by the diagrams Figs. 34 and 35, it will be noticed in Fig. 1 that I secure on the head of the shaft $P^2$, which turns with the sender, a beveled segmental rack Q, which engages with a similar beveled segmental rack Q', to the shaft of which is secured a lever-arm $Q^2$, said lever-arm connecting by a rod $Q^3$ with the arm $Q^4$ of a lever $Q^4 Q^5$, centrally pivoted at $Q^6$ to the end of a lever-arm $Q^7$, which in turn is pivoted at $Q^8$ to a fixed point on the frame and is provided at $q^7$ with a laterally-projecting stud, which projects into a cam-groove $Q^9$, formed in a plate which is attached to and moves with the receiver-drum E'. The arm $Q^5$ of the lever $Q^4 Q^5$ is attached to the head of a rod $Q^{10}$, which (see Figs. 28 and 29) is connected to a cross-head $Q^{11}$, moving in vertical guideways and formed, as shown, with a vertical perforation, (indicated at $Q^{12}$ and $Q^{13}$.) At the left-hand side the face of the cross-head is cut away into the vertical perforation, and upon lateral lugs on each side of the slot is supported a pin $Q^{16}$, upon which is pivoted a lever $Q^{14} Q^{15}$, shaped as indicated, and, by means of a lever-arm $Q^{17}$ on the pin $Q^{16}$ and a spring $Q^{18}$, held normally in the position shown in Fig. 29.

At $Q^{20}$, I have indicated the framing in which the guideways of the head $Q^{11}$ are formed and upon which is formed the plate $q^{20}$, to which in turn is secured by screws $q^{23}$ the plate $q^{21}$, formed with an inner recess $q^{22}$ and threaded perforations, as shown, for the adjusting-screws $q^{24}$ and $q^{25}$.

$Q^{21}$ is a finger or plate fitting in recess $q^{22}$, vertically adjusted by screw $q^{24}$ and clamped in place against plate $q^{20}$ by screw $q^{25}$. The lower end of finger $Q^{21}$ is in line with the end $Q^{15}$ of the lever $Q^{15} Q^{14}$, the arrangement being such that when the cross-head carrying such lever is raised the finger $Q^{21}$ will rock the lever to the left.

$Q^{22}$ is a lever pivoted on the frame $Q^{20}$ at $Q^{23}$. Said lever is slotted, as indicated in Fig. 29, to permit the passage of a rod through it and provided on each side of this rod with lugs $Q^{24}$, upon which the head $Q^{53}$, to be hereinafter described, rests. The outer free end of the lever $Q^{22}$ is formed with a downwardly-projecting lug $Q^{25}$, which normally rests on the head of the valve-stem $Q^{36}$, and by means of a binding-screw $q^{26}$ a wire $T^{17}$ is connected to said lever $Q^{22}$.

$Q^{26}$ is a contact plate or finger secured to lever $Q^{22}$ and electrically connected to the binding-screw $q^{26}$. Lying immediately above the contact plate or finger $Q^{26}$, but normally out of contact therewith, is the similar finger $Q^{27}$, fastened to a stationary portion of the frame and connected, by means of a binding-post $q^{27}$, with the wire $T^{15}$.

$Q^{28}$ is a valve-box quite similar in general character to the valve-boxes $M^{11}$ and $L^{11}$. It is formed with chambers $Q^{29}$ and $Q^{30}$, connecting through lateral ports $q^{29}$ and $q^{30}$, with the pipes $v$ and $v^8$ and through a valve-seated passage $Q^{32}$ with each other. The chamber $Q^{30}$ has also a perforation leading from it through the upper head of the box and indicated at $Q^{31}$.

$Q^{33}$ is a valve-spindle, to which is attached a valve $Q^{34}$, situated in the chamber $Q^{30}$ and adapted to close the port $Q^{32}$. A spring $Q^{35}$, however, acts upon the valve to normally hold it away from its seat. To the upper end of the valve is attached the enlarged spindle $Q^{36}$, having a central perforation $Q^{37}$ with lateral openings $Q^{38}$, which when the valve is seated open into the chamber $Q^{30}$, but which are closed by the walls $Q^{31}$ when the valve is raised, and other lateral openings $Q^{39}$ place the hollow rod in communication with the outer air.

$Q^{41}$ is a dash-pot cylinder, upon the head $Q^{19}$ of which the framing $Q^{20}$ is conveniently secured or preferably formed therewith, as shown, an opening closed by screw-plug $Q^{40}$ serving for the admission of oil into the cylinder. In the cylinder is situated a piston $Q^{42}$, formed with perforations $q^{42}$, leading through it, and connected to the end of the piston-rod $Q^{50}$, $Q^{51}$ indicating a valve which automatically opens when the piston is drawn upward and automatically closes, sealing the perforation $q^{42}$. When the piston is forced downward, the upper and lower portions of the cylinder $Q^{41}$ connect through a vertical lateral passage $Q^{43}$, opening into the bottom of the cylinder at $Q^{44}$ and into the upper part of the cylinder through the port $Q^{45}$. A cock $Q^{46}$, actuated by the rod $Q^{47}$, serves to regulate the opening between the top and bottom of the cylinder, and a finger $Q^{48}$ on the rod $Q^{47}$ serves to indicate on a dial $Q^{49}$ the position of the cock.

$Q^{52}$ is a spring situated in the cylinder $Q^{41}$ and serving to press the piston and piston-rod downward, as shown.

$Q^{53}$ and $Q^{54}$ are heads secured to the top of the rod $Q^{50}$, the upper one being preferably adjustable on a threaded portion of the rod, as shown, these heads moving in a perforation $Q^{12}$ $Q^{13}$ of the head $Q^{11}$ and the upper head $Q^{54}$ being normally engaged with said head $Q^{11}$ by means of the latch-lever $Q^{14}$ $Q^{15}$, as shown in Fig. 29.

By reference to Fig. 1 it will be obvious that the rod $Q^{10}$ is raised by either of two movements of the apparatus. Thus it is raised by the movement of the sending apparatus acting through the gears Q and Q', lever $Q^2$, and rod $Q^3$ on the lever $Q^4$ $Q^5$, turning on the pivot $Q^6$; but it is also raised by the rotation of the receiving-drum acting through its cam-plate $Q^9$ on the stud $q^7$ of the lever $Q^7$ and through that lever on the lever $Q^4$ $Q^5$, which in this case turns on its pivotal attachment to the rod $Q^3$ as a fulcrum. In either case the upward movement of the rod $Q^{10}$ carries with it the cross-head $Q^{11}$, the piston-rod $Q^{50}$, and piston $Q^{42}$, the oil in the cylinder $Q^{41}$ escaping freely through the perforations $q^{42}$ in the piston. As soon, however, as the head $Q^{53}$ ceases to rest upon the shoulders $Q^{24}$ of the lever $Q^{22}$ this lever, under the influence of the spring $Q^{35}$ or any spring placed to have a similar action on the lever, moves upward, with the result, in the first place, of permitting the valve $Q^{34}$ to open, permitting (see Figs. 28 and 35) air under pressure from pipe V to pass through the box $Q^{28}$ into the pipe $V^3$ and thence into the head of the cylinder $P^{46}$, where (see Fig. 20) it acts through the piston $P^{47}$ to push the bolt $p^{45}$ inward, and if the bolt-hole $P^{42}$ is in registry with the bolt engage it with the block $P^{41}$, thus locking the sending apparatus; but of course if the motion has been communicated to the rod $Q^{10}$ by a movement of the sender this locking would not take place, because the block $P^{41}$ would have moved and its locking-perforation $P^{42}$ be thus out of line with the bolt before the bolt was actuated, in which case, of course, the bolt will simply press against the side of the block $P^{41}$ and only engage with it when it returns to its normal position after the sender has performed its function. The upward movement of the lever $Q^{22}$ also brings the contact-fingers $Q^{26}$ and $Q^{27}$ into contact, the effect of which can be traced in the diagram Fig. 34 and is to place the wire $T^{11}$, in which the electromagnet $J^{13}$ is situated, in electrical connection with the finger $g^{30}$, so that the contact of the rod $G^{31}$ with the spring-fingers $g^{30}$ will simultaneously close the circuits through all three of the electromagnets $R^{19}$, $P^{57}$, and $J^{13}$, the result of which, as has been already fully described, is to cause the delivery of all carriers arriving at the substation while these conditions prevail.

Returning to the operation of the apparatus shown in Figs. 28 and 29, it will be seen that as the cross-head $Q^{11}$ moves upward it will finally bring the lever-arm $Q^{15}$ of the lever $Q^{15}$ $Q^{14}$ into contact with the finger $Q^{21}$, forcing the arm $Q^{14}$ of the lever outward until it releases its engagement with the head $Q^{54}$, whereupon the weight of the connected parts plus the power of the spring $Q^{52}$ tends to restore the piston $Q^{42}$ to its normal lowermost position; but as the piston moves downward the valve $Q^{51}$ closes the perforation $q^{42}$, so that all of the air in the lower part of the cylinder must move through the port $Q^{44}$, by-pass $Q^{43}$, regulating-cock $Q^{46}$, and port $Q^{45}$, the resistance developed by the position of the regulating-cock determining the speed with which the piston will move downward, and consequently the length of time during which the valve $Q^{34}$ will remain open and the circuit-wires $T^{17}$ and $T^{15}$ connected. As soon as the weight and spring-pressure, acting through the head $Q^{53}$, act upon the shoulders $Q^{24}$ of the lever $Q^{22}$ the parts are of course returned to their normal position, as indicated in Fig. 28, and the air, acting through the cylinder $P^{46}$ to keep the bolt $p^{45}$ in engagement with the head $P^{41}$, is permitted to exhaust through the hollow spindle $Q^{36}$.

For economy and convenience I have devised and shown the above-described arrangement by which a single time-escapement device is made to serve both for regulating the time during which the electric circuit shall remain connected and also the time during which the locking-bolt shall be forced in. Save where the double-acting device is specifically called for in the claims, I do not, however, wish to be understood as limiting any of my claims upon its presence.

In order to effect the disengagement of the latching-hook $P^{31}$ (see Fig. 24) with the sender-lever $P^{25}$, with the consequent return of the sender-lever and shifting of the valves of the sender-motor to normal position, I make use of a finger O, (see Figs. 1, 2, 19, 26, and 27,) and as this finger has only a useful function in a case of the discharge of a carrier from the sending apparatus I arrange it so that it will only come in the path of carriers projected into the tube B from the sending apparatus and so that it will be withdrawn from the path of carriers passing into the tube B from the receiving and transmitting apparatus. Referring to Figs. 26 and 27, it will be seen that the finger O is attached to a rock-shaft $O'$, having a spring $o'$, acting to turn it toward the right, and that the shaft $O'$ is connected by a crank-arm $O^2$ and a connecting-rod $O^{22}$ with the arm $O^{20}$ of the lever $O^{20}$ $O^{21}$, pivoted at $O^{19}$ to the end of a longitudinally-movable rod $O^{17}$, moving with some frictional resistance in a fixed bearing $O^{18}$ and pivotally connected at its other end to a bar $O^3$, having a slotted offset $O^5$ and a free end $O^6$, which comes opposite to the end of a valve-rod secured to a valve and working in a valve-box $O^{11}$, which box and its connections are in all respects similar to the valve-boxes $M^{11}$ and $L^{11}$, previously described, the two chambers of the valve-box connecting, as best shown in Fig. 35, with a supply-pipe $V^9$ for air under pressure and with a conduit $V^{10}$, leading into the end of the cylinder $P^{34}$. The movement of the bar $O^3$ to engage and disengage the valve-stem is also governed by mechanism substantially similar to that acting on the similar bars $M^3$ and $L^3$, a piston-rod $O^9$ connecting into the slot $O^5$ and with a piston $O^8$, moving in the cylinder $O^7$; into the head of which cylinder leads the conduit $V^{11}$, which, as shown in Fig. 35, leads to the lateral opening in the side of the cylinder $P^{34}$. Returning now to the lever $O^{20}$ $O^{21}$, it will be observed (see Figs. 26 and 27) that the arm $O^{21}$ of this lever is connected by a pivotally-attached rod $O^{23}$ with the short arm $O^{24}$ of the lever $O^{24}$ $O^{25}$, moving on a fixed pivot $O^{26}$, and the long arm $O^{25}$ of which is connected by a rod $O^{27}$ with a pivot-pin $O^{28}$, secured on the frame $P^3$ of the sending apparatus.

When the sender is in its normal transmitting and receiving position, as indicated in Figs. 1, 19, 26, and 27, the position of the parts above described are as shown in Figs. 26 and 27—that is to say, the finger O is withdrawn out of the path of the carrier moving from the receiver into the tube B; when, however, the sender is actuated to inject a carrier into the tube B, the movement of the sender, acting through the rod $O^{27}$, draws the lever-arm $O^{25}$, and, acting through the connections with lever $O^{25}$ $O^{24}$, turns the lever $O^{21}$ $O^{20}$ on its pivoted connection with rod $O^{17}$ toward the left—a movement which, acting through the rod $O^{22}$ and the crank $O^2$, turns the end $O'$ to the right and the finger O outward into the path of the carrier. The frictional resistance of bearing $O^{18}$ on rod $O^{17}$ holds the said rod stationary while this is accomplished. The carrier issuing from the center then coming against the finger O presses it downward, and the lever $O^{20}$ $O^{21}$ being now fulcrumed on its pivotal attachment to the link $O^{23}$ has its upper end pressed toward the right by the rod $O^{22}$ and draws out the bar $O^{17}$, and with it the bar $O^3$, until its end $O^6$ clears the end of the valve-rod in the box $O^{11}$, when the weight of the piston $O^8$ or a spring acting against it draws the bar $O^3$ into a position in which its end lies opposite to the valve-stem. The action of the spring $o'$ of course restores the finger O to its position projecting into the tube when the carrier has passed, and, acting through the crank $O^2$, rod $O^{22}$, and lever $O^{20}$ $O^{21}$, presses the rod $O^{17}$ and the connected bar $O^3$ toward the left, where, pressing against the valve-rod, it opens the valve, permitting the air under pressure to flow from conduit $V^9$ through box $O^{11}$ to conduit $V^{10}$, thence into cylinder $P^{34}$, where (see Fig. 24) it moves the piston $P^{33}$ to the left, unhooks the latching-hook $P^{31}$ from the lever $P^{25}$, permitting this lever to fall, and by its described connections thus restoring the valve of the motor-cylinder to normal position. After having moved the piston $P^{33}$ the air escapes into the conduit $V^{11}$, and, as shown in Fig. 35, is led into the head of the cylinder $O^7$, pressing the piston $O^8$ upward and disengaging the bar $O^3$ from the valve-spindle, against which it presses, whereupon the valve in the box $O^{11}$ closes, shutting off the connection between the pipes $V^9$ and $v^{10}$ and opening the pipe $V^{10}$ to exhaust into the atmosphere. This of course permits the spring $P^{35}$, Fig. 24, to restore the piston $P^{33}$ to normal position, and as the piston in moving cuts off the backward flow of air from conduit $V^{11}$ into conduit $V^{10}$ I provide the air-escape $P^{38}$, which permits the complete exhaust of conduit $V^{11}$, as is clearly seen in Fig. 34. It is of course obvious that as soon as the sender swings back to its normal receiving and transmitting position the mechanism described effects the retraction of the finger O.

In the drawings above described I have illustrated my invention, as required by law, in the best manner in which I have applied its various features to practical use. The leading features of my invention are, however, applicable to very numerous, if not all, forms of pneumatic transmission receiving and sending devices, and, except where in the claims I refer to the specific constructions illustrated, I do not wish to be understood as limiting such claims to machines embodying such illustrated devices. Thus, for illustration, I have in Fig. 36 of the drawings illustrated the application of many of the important features of my invention to a construction in which the receiving device is a mere branch tube, the entry of a carrier into this tube or its passage beyond it being regulated by a switch in the main tube. This branch receiving-tube is indicated at $c$, and the switch referred to is indicated at $e^2$, being shown as pivoted at $e$ on a shaft to which is also attached a lever $e'$, said lever in turn being pivotally connected with a core-bar X, moving at one end in a solenoid-coil W and at the other end in a similar coil W', which may, however, be of less power. A spring $e^3$ is shown as also attached to the lever $e'$, and by means of which the switch is drawn into position to direct a carrier into the receiving-tube when the solenoid W is not energized. The power of this solenoid, which is situated in a normally closed circuit $t^4$ $t^4$, including battery $t$, being sufficient to hold the switch up against the pull of spring $e^3$, but less than the joint power of spring $e^3$ and solenoid W', which is situated in the normally open circuit $t^8$ $t^8$, including battery $t^3$, it follows then that the switch $e^2$ is moved from the position indicated in dotted lines to a position across tube A whenever circuit $t^4$ $t^4$ is opened or circuit $t^8$ $t^8$ closed. At $t^{13}$ I have indicated a switch for opening and closing circuit $t^4$ $t^4$ and also an electromagnet $W^5$, which closes said switch when energized, said magnet being situated in a normally open circuit $t^{11}$ $t^{11}$, including a battery $t^{14}$ and a circuit-closing finger $t^{12}$, which is moved to close the circuit on the escape of a carrier from branch tube $c$. Obviously, then, by opening switch $t^{13}$, either by hand or in any convenient way, the delivery of a carrier through tube $c$ is insured, while the escape of the carrier, acting through finger $t^{12}$, recloses circuit $t^4$ $t^4$ and sets the switch for the main line.

I have shown between the ends P and P' of the tubes A and B a sender having receiving and transmitting tubes $p^5$ and $p^6$, and at $p^{52}$ and $p^{48}$ I have indicated locking-bolts for preventing movement of the sender. The bolt $p^{52}$ is actuated through a lever X' by electromagnets $W^3$ and $W^4$, the magnet $W^3$ being situated in a normally open circuit $t^5$ $t^5$, including battery $t'$, and a circuit-closing finger $g^\times$, situated in tube A and arranged to be closed by a carrier approaching the substation. The consequent closing of the circuit energizes magnet $W^3$ and shoots the bolt $p^{52}$, which maintains the sender in locked position until the magnet $W^4$ is energized to withdraw the bolt, which occurs whenever a carrier passes either the circuit-closing finger $l$ in tube $c$ or the similar finger $o$ in tube B, the circuit in the one case being indicated by wires $t^6$ $t^6$, including battery $t^2$, and in the other case by wires $t^6$ $t^6$ $t^7$ $t^7$. The branch circuit-wire $t^7$ $t^7$ includes a solenoid-coil $W^2$, acting through a core $X^2$ and connecting-rod $Q^{10}$ to shoot the other sender-lock $p^{48}$ and also to actuate a circuit-closing switch Y, situated in a circuit $t^8$ $t^8$, including battery $t^3$ and the solenoid W', the withdrawal of the locking-bolt and opening of circuit $t^8$ $t^8$ being effected by a time-escapement, (indicated at $Q^{41}$.) Obviously, then, a carrier passing finger $o$ at the same time sets lock $p^{48}$ to engage the sender either at once, if it is in sending position, or as soon as it returns to such position, and also sets switch $e^2$ to position to deliver through branch $c$, this adjustment lasting for a time determined by the time-escapement. It is also advisable that the switch should be set for branch $c$ whenever the sender is operated, and this is provided for by a circuit-closing finger, (indicated at $t^{10}$,) which is closed by a movement of the sender and connected in a branch circuit $t^9$ $t^9$, connected with wires $t^6$ and $t^7$, as indicated, and so as to close the circuit leading through solenoid $W^2$, by which the switch-actuating circuit is closed and the time-escapement set in operation.

The above-described modification, or rather diagrammatic plan, of the leading features of my invention is given principally to indicate the entire interdependence of such leading features of special mechanical forms and connections.

Having now described my invention, what I claim as new, and desire to secure by Letters Patent, is—

1. In a pneumatic transmission system, the combination with a tube of a switching device arranged to direct a carrier passing through the tube into a continuation thereof or into a delivery-passage, a time-escapement actuating device arranged to be set in operation by a carrier and a time-escapement device set in operation by the approach of a carrier and acting on the switching device, whereby the switching device is actuated to effect the delivery of carriers which reach it within a determined period after the passage of another carrier.

2. In a pneumatic transmission system, the combination with a tube of a switching device arranged to direct a carrier passing through the tube into a continuation thereof or into a delivery-passage, a sender arranged in the tube on the delivery side of said switching device, and means connected with and operated by the sender for actuating the switching mechanism to effect the delivery of a carrier or carriers arriving while the sender is in operation.

3. In a pneumatic transmission system, the combination with a tube of a switching device, arranged to direct a carrier passing through the tube into a continuation thereof or into a delivery-passage, a sender arranged in the tube on the delivery side of said switching device and means including a time-escapement for actuating the switching mechanism to effect the delivery of a carrier for a determined time after each movement of the sender.

4. In a pneumatic transmission system, the combination with a tube of a switching device arranged to direct a carrier passing through the tube into a continuation thereof or into a delivery-passage, a sender arranged in the tube on the delivery side of said switching device, means connected with and operated by the sender for actuating the switching mechanism to effect the delivery of a carrier or carriers arriving while the sender is in operation, and means including a time-escapement whereby the switching mechanism is actuated to effect the delivery of a carrier for a determined time after each movement of the sender.

5. In a pneumatic transmission system, the combination with a tube of a switching device arranged to direct a carrier passing through the tube into a continuation thereof or into a delivery-passage, a sender arranged in the tube on the delivery side of said switching device, a lock to prevent motion of the sender and means for setting said lock actuated by the approach of a carrier to the switching mechanism.

6. In a pneumatic transmission system, the combination with a tube of a switching device arranged to direct a carrier passing through the tube into a continuation thereof or into a delivery-passage, a sender arranged in the tube on the delivery side of said switching device, a lock to prevent motion of the sender, means for setting said lock actuated by the approach of a carrier to the switching mechanism, a second lock for the sender and means including a time-escapement for setting said lock actuated by the movement of the switching device.

7. In a pneumatic transmission system, the combination with a tube of a switching device arranged to direct a carrier passing through the tube into a continuation thereof or into a delivery-passage, a sender arranged in the tube on the delivery side of said switching device, means whereby the approach of a carrier to the switching mechanism effects the locking of the sender and means whereby the actuation of the sender effects the switching out of the tube of carriers arriving during such actuation.

8. A receiver for a pneumatic transmission system, arranged to direct a carrier entering it from a transmission-tube either into a continuation of said tube or into a delivery-passage, means arranged to be actuated by a selecting device on a carrier for actuating the receiver to deliver such carrier and manually-operative means whereby the receiver can be actuated to deliver the carriers independently of the presence of such selecting devices.

9. A receiver for a pneumatic transmission system, arranged to direct a carrier entering it from a transmission-tube either into a continuation of said tube or into a delivery-passage, means arranged to be actuated by a selecting device on a carrier for actuating the receiver to deliver such carrier, a sender in the transmission-tube, means actuated by the operation of the sending mechanism whereby the receiver is actuated to deliver carriers arriving while such sending mechanism is in operation and manually-operative means whereby the receiver can be actuated to deliver the carriers independently of the presence of selecting devices on the carrier or of the operation of the sender.

10. A receiver for a pneumatic transmission system, movable from a receiving position to a delivering position and to a transmitting position in combination with means for operating the receiver arranged to be set in motion by the entrance of a carrier, means controlling the arrest of the receiver for delivering or transmitting the carrier and means including a time-escapement actuated by the movement of the receiver and controlling the arresting mechanism as specified and whereby it is set to effect the delivery of a carrier for a determined time after each movement of the receiver.

11. A receiver for a pneumatic transmission system movable from a receiving position to a delivering position and to a transmitting position, in combination with a sender operating in the tube with which said receiver registers for transmission, means for operating the receiver arranged to be set in action by the entrance of a carrier, means for arresting the receiver in its delivering position, means for operating the sender, and means for connecting the receiver-arresting device aforesaid whenever the sender-actuating device is in operation, whereby all carriers arriving during the operation of the sender are delivered at the station where the receiver is situated.

12. A receiver for a pneumatic transmission system movable from a receiving position to a delivering position and to a transmitting position, in combination with a sender operating in the tube with which said receiver registers for transmission, means for operating the receiver arranged to be set in action by the entrance of a carrier, means for arresting the receiver in its delivering position, and a time-escapement device actuated by the motion of the sender arranged to connect the receiver-arresting device aforesaid and maintain such connection for a determined time after the sender has been used, whereby all carriers arriving for a determined time after the operation of the sender are delivered at the station where the receiver is situated.

13. A receiver for a pneumatic transmission system movable from a receiving position to a delivering position and to a transmitting position, in combination with a sender operating in the tube with which said receiver registers for transmission, means for operating the receiver arranged to be set in action by the entrance of a carrier, means for arresting the receiver in its delivering position, means for operating the sender, means for connecting the receiver-arresting device aforesaid whenever the sender-actuating device is in operation, and a time-escapement device actuated by the motion of the sender arranged to connect the receiver-arresting device aforesaid and maintain such connection for a determined term after the sender has been used whereby all carriers arriving during and for a determined time after the operation of the sender are delivered at the station where the receiver is situated.

14. A receiver for a pneumatic transmission system movable from a receiving position to a delivering position and to a transmitting position, in combination with a sender operating in the tube with which said receiver registers for transmission, means for operating the receiver arranged to be set in action by the entrance of a carrier, means for locking the sender in non-operative position also arranged to be set in operation by the entry of a carrier into the receiver and actuating means for releasing said lock arranged to be operated by the escape of a carrier from the receiver, whereby the insertion of a carrier into the transmission-tube by the sender is prevented during the operation of the receiver.

15. A receiver for a pneumatic transmission system movable from a receiving position to a delivering position and to a transmitting position, in combination with a sender operating in the tube with which said receiver registers for transmission, means for operating the receiver arranged to be set in action by the entrance of a carrier, a time-escapement arranged to be set in operation by the movement of the receiver and means for locking the sender in non-operative position controlled by said time-escapement and whereby the insertion of a carrier into the transmission-tube by the sender is prevented during and for a determined time after the operation of the receiver.

16. A receiver for a pneumatic transmission system movable from a receiving position to delivering position and to a transmitting position, in combination with a sender operating in the tube with which said receiver registers for transmission, means for operating the receiver arranged to be set in action by the entrance of a carrier, means for locking the sender in non-operative position also arranged to be set in operation by the entrance of a carrier into the receiver, means for releasing said lock actuated by the escape of a carrier from the receiver, a time-escapement arranged to be set in operation by the movement of the receiver and means for locking the sender in non-operative position controlled by said time-escapement all substantially as described and whereby the insertion of a carrier into the transmission-tube by the sender is prevented during and for a determined time after the operation of the receiver.

17. A receiver for a pneumatic transmission system movable from a receiving position to a delivering position and to a transmitting position in combination with a sender operating in the tube with which said receiver registers for transmission, means for operating the receiver arranged to be set in action by the entrance of a carrier, means for arresting the receiver in its delivering position, means for operating the sender, means for connecting the receiver-arresting device aforesaid whenever the sender-actuating device is in operation, means for locking the sender in non-operative position also arranged to be set in operation by the entrance of a carrier into the receiver, and means for releasing said lock actuated by the escape of a carrier from the receiver whereby all carriers arriving during the operation of the sender are delivered at the station where the receiver is situated and the insertion of a carrier into the transmission-tube by the sender is prevented during the operation of the sender.

18. In a pneumatic transmission system the combination with a transmission-tube of a switching device adapted to direct a carrier into a continuation of the tube or into a delivery-passage, a sender situated in the continuation of the tube, a sender-lock arranged to hold it in non-operative position and insure a free passage through the tube, mechanism for actuating the switching device, electromagnetic mechanism arranged to be actuated by the entry of a carrier into the switching device and whereby the mechanism for actuating said device and the sender-lock are simultaneously operated and means actuated by the escape of the carrier from the switch mechanism for effecting the return of the switch mechanism to receiving position and for releasing the switch-lock.

19. In a pneumatic transmission system the combination with a transmission-tube of a switching device adapted to direct a carrier into a continuation of the tube or into a delivery-passage, a sender situated in the continuation of the tube, a sender-lock arranged to hold it in non-operative position and insure a free passage through the tube, mechanism for actuating the switching device, electromagnetic mechanism arranged to be actuated by the entry of a carrier into the switching device and whereby the mechanism for actuating said device and the sender-lock are simultaneously operated, means actuated by the escape of the carrier from the switch mechanism for effecting the return of the switch mechanism to receiving position and for releasing the switch-lock, a second sender-locking device arranged to be set in operation by the motion of the switch after the arrival of a carrier, and a time-escapement lock-releasing mechanism arranged to release said last-mentioned lock a determined time after the switch has moved.

20. In a pneumatic transmission system the combination with a transmission-tube of a switching device adapted to direct a carrier into a continuation of the tube or into a delivery-passage, a sender situated in the continuation of the tube, sender-actuating mechanism normally arranged to hold the sender in position to receive a carrier and to leave a free passage through the tube, a device, as lever P$^{25}$, resilient means through which said device operates to shift said mechanism and through it the sender, a latch to hold said device in such operative position, a sender-lock arranged to hold the sender in non-operative position and insure a free passage through the tube, means for actuating the switching device, electromagnetic mechanism arranged to be actuated by the entry of a carrier into the switching device and whereby the mechanism for actuating said device and the sender-lock are simultaneously operated, means actuated by the escape of the carrier from the switch mechanism for effecting the return of the switch mechanism to receiving position and for releasing the sender-lock, and latch-releasing mechanism actuated by the escape of a carrier from the sender whereby the sender-shifting device and sender-actuating mechanism are returned to normal position.

21. In a pneumatic transmission system, the combination with a transmission-tube of a switching device adapted to direct a carrier into a continuation of the tube or into a delivery-passage, a sender situated in the continuation of the tube, sender-actuating mechanism normally arranged to hold the sender in position to receive a carrier and to leave a free passage through the tube, a device, as lever P$^{25}$, resilient means through which said device operates to shift said mechanism and through it the sender, a latch to hold said device in such operative position, a sender-lock arranged to hold the sender in non-operative position and insure a free passage through the tube, means for actuating the switching device, electromagnetic mechanism arranged to be actuated by the entry of a carrier into the switching device and whereby the mechanism for actuating said device and the sender-lock are simultaneously operated, means actuated by the escape of the carrier from the switch mechanism for effecting the return of the switch mechanism to receiving position and for releasing the sender-lock, a second sender-locking device arranged to be set in operation by the motion of the switch after the arrival of a carrier, a time-escapement lock-releasing mechanism arranged to release said last-mentioned lock a determined time after the switch has moved and latch-releasing mechanism actuated by the escape of a carrier from the sender whereby the sender-shifting device and sender-actuating mechanism are returned to normal position.

22. In a pneumatic transmission system the combination with a transmission-tube of a receiver movable from a receiving to a delivering and to a transmitting position, a sender situated in the continuation of the transmission-tube, receiver-actuating mechanism, a sender-lock, sender-actuating mechanism, electromagnetic mechanism for setting in operation the receiver-actuating mechanism and the sender-lock, said mechanism being made operative by the entrance of a carrier into the receiver, a device for arresting the receiver at its delivery position, electromagnetic mechanism for actuating said device with circuits arranged to be closed through the entrance of a carrier into the receiver either by a selecting device on a carrier or by a movement of the sender and means actuated by the escape of a carrier from the receiver for effecting the return of the receiver to normal position and for releasing the sender.

23. In a pneumatic transmission system the combination with a transmission-tube of a receiver movable from a receiving to a delivering and to a transmitting position, a sender situated in the continuation of the transmission-tube, receiver-actuating mechanism, a sender-lock, sender-actuating mechanism, electromagnetic mechanism for setting in operation the receiver-actuating mechanism and the sender-lock, said mechanism being made operative by the entrance of a carrier into the receiver, a device for arresting the receiver at its delivery position, electromagnetic mechanism for actuating said device with circuits arranged to be closed through the entrance of a carrier into the receiver either by a selecting device on a carrier or by a movement of the sender, a time-escapement for maintaining the circuit closed for a determined period after the movement of the sender, and means actuated by the escape of a carrier from the receiver for effecting the return of the receiver to normal position and for releasing the sender-lock.

24. In a pneumatic transmission system the combination with a transmission-tube of a receiver movable from a receiving to a delivering and to a transmitting position, a sender situated in the continuation of the transmission-tube, receiver-actuating mechanism, a sender-lock, sender-actuating mechanism, electromagnetic mechanism for setting in operation the receiver-actuating mechanism and the sender-lock, said mechanism being made operative by the entrance of a carrier into the receiver, a second sender-lock actuated by a movement of the receiver, a device for arresting the receiver at its delivery position, electromagnetic mechanism for actuating said device with circuits arranged to be closed through the entrance of a carrier into the receiver either by a selecting device on a carrier or by a movement of the sender, a time-escapement arranged to hold the second sender-lock engaged and to maintain the circuit closed by the movement of the sender for a determined period after a movement by the receiver or sender, and means actuated by the escape of a carrier from the receiver for effecting the return of the receiver to normal position and for releasing the sender.

25. The combination of the rotative receiver with a device for operating it, electric-circuit terminals arranged to project into the end of the receiver when in receiving position and to be actuated by the entrance of a carrier to close a circuit or circuits affecting the operation of the machine, a retractable support for said terminals, means as a spring acting on said support to withdraw it and the terminals from operative position, and means for forcing the support and terminals forward arranged to be operated by the receiver-actuating device during the end of its movement to restore the receiver to receiving position and to be released by the motion of said device in a direction to withdraw the receiver from such position.

26. The combination of the rotating receiver with a device for operating it arranged to move through a certain distance before actuating the receiver, electric-circuit terminals arranged to project into the end of the receiver when in receiving position and to be actuated by the entrance of a carrier to close the circuit or circuits affecting the operation of the machine, a retractable support for said terminals, means as a spring acting on said support to withdraw it and the terminals from operative position, and means for forcing the support and terminals forward arranged to be operated by the receiver-actuating device during the end of the movement to restore the receiver to receiving position and to be released by the motion of said device in a direction to withdraw the receiver from such position and before said device actually moves the receiver.

27. The combination with a pneumatic transmission-tube and a tubular receiver arranged to work in connection therewith, a head adapted to close the rear end of the receiver when in position to receive a carrier, a valve-seated passage, as $G^2$, leading through said head to an escape-passage, a valve, as $G^9$, arranged to open and close passage $G^2$, a resilient device tending to open said valve, a catch arranged to hold the valve closed and means for releasing said catch operated by an increase of pressure in the receiver.

28. The combination with a pneumatic transmission-tube and a tubular receiver arranged to work in connection therewith, a head adapted to close the rear end of the receiver when in position to receive a carrier, a valve-seated passage, as $G^2$, leading through said head to an escape-passage, a valve, as $G^9$, arranged to open and close passage $G^2$, resilient means involving air-pressure from the transmission-tube tending to open said valve, a catch arranged to hold the valve closed and means for releasing said catch operated by an increase of pressure in the receiver over that tending to open the valve.

29. The combination with a pneumatic transmission-tube and a rotatable tubular receiver arranged to work in connection therewith, a stationary head adapted to close rear end of the receiver when in position to receive a carrier, a valve-seated passage, as $G^2$, leading through said head to an escape-passage, a valve, as $G^9$, arranged to open and close passage $G^2$, resilient means tending to open said valve, a catch arranged to hold the valve closed and means for releasing said catch operated by an increase of pressure in the receiver.

30. The combination with a pneumatic transmission-tube and a rotatable tubular receiver arranged to work in connection therewith, a stationary head adapted to close the rear end of the receiver when in position to receive a carrier, electric-circuit terminals arranged in the face of the head, a valve-seated passage, as $G^2$, leading through said head to an escape-passage, a valve arranged to close passage $G^2$ when the receiver is in position to receive a carrier, and means actuated by the compression of air in the receiver due to an entering carrier, for opening said valve.

31. The combination with a pneumatic transmission-tube and a rotatable tubular receiver arranged to work in connection therewith, a stationary head adapted to close the rear end of the receiver when in position to receive a carrier, electric-circuit terminals arranged in the face of the head, a valve-seated passage as $G^2$, leading through said head to an escape-passage, a valve arranged to close passage $G^2$ when the receiver is in position to receive a carrier, means, actuated by the compression of air in the receiver due to an entering carrier, for opening said valve, and means actuated by the movement of the receiver for reclosing the valve.

32. In a receiving apparatus substantially as specified the combination with a receiver and receiver-actuating mechanism of a normally stationary receiver-head, as G, having retractable circuit-terminals and an exhaust-valve arranged to be opened by the approach of a carrier, an electric circuit containing the retractable terminals and means for retracting the terminals and reclosing the valve arranged to be operated by the initial movement of the receiver-actuating mechanism.

33. In a receiving apparatus substantially as specified the combination with the framing in which the receiver moves and in which is formed an aperture $D^8$ registering with the rear end of the receiver when in receiving position, of a head G adapted to fit into said aperture, a crane-arm $d^3$ secured to the framing above aperture $D^8$, a trolley running on 41. In a pneumatic receiving apparatus the combination with a receiver, movable from a receiving to a delivering and a transmitting position, of a motor for said receiver, connections from said motor to said receiver including a sliding head $F^2$, mechanism for arresting the receiver in delivery position and effecting the delivery of a carrier therefrom, an operating connection from said mechanism including a sliding head J, a catch whereby the heads $F^2$ and J can be coupled and the head J thereby operatively connected to the motor, means whereby said catch is normally held disengaged, means for engaging said catch and means for disengaging said catch operating on a return movement of the heads.

42. In a pneumatic receiving apparatus the combination with a receiver, movable from a receiving to a delivering and a transmitting position, of a motor for said receiver, connections from said motor to said receiver including a sliding head $F^2$, mechanism for arresting the receiver in delivery position and effecting the delivery of a carrier therefrom, an operating connection from said mechanism including a sliding head J, a catch whereby the heads $F^2$ and J can be coupled and the head J thereby operatively connected, means whereby said catch is normally held disengaged, electromagnetic means for engaging said catch and means for disengaging said catch operating on a return movement of the heads.

43. In a pneumatic-transit receiving apparatus the combination of a motor, a receiver actuated thereby and a connection between the same with a head $F^2$ interposed in the connection between the receiver and motor, and having a finger $F^7$, a lever $I^{12} I^{13}$ arranged to be engaged and operated by a finger $F^7$ as it approaches and recedes from its normal position of rest, movable circuit-terminals arranged to project into the receiver when at rest, and means operated by lever $I^{12} I^{13}$ for actuating said terminals as described.

44. In a pneumatic-transit receiving apparatus the combination of a motor, a receiver actuated thereby and a connection between the same with a head $F^2$ interposed in the connection between the receiver and motor and having a finger $F^7$, a lever $I^{12} I^{13}$ arranged to be engaged and operated by finger $F^7$ as it approaches and recedes from its normal position of rest, movable circuit-terminals arranged to project into the receiver when at rest, an exhaust-valve opening from the receiver and arranged to be opened by an entering carrier, and means operated by lever $I^{12} I^{13}$ for actuating the terminals and closing the exhaust-valve as described.

45. In a pneumatic transmission system the combination with a movable receiver and a pneumatic motor $F^4$ for actuating the same, of a valve for controlling the admission of air to the motor, constantly-acting means, as spring $R^{12}$ tending to move the valve to position to move the receiver from its normal position of rest, a latch, as $R^{16}$, arranged to lock the valve in position to move and hold the receiver to and in its said normal position, a device actuated by the entry of a carrier to the receiver operating to release said catch, a pneumatic cylinder, and piston as $R^{10}$, $R^{11}$ arranged when in operation to overcome spring $R^{12}$ and move the valve into engagement with the latch $R^{16}$, and means actuated by the escape of a carrier from the receiver for temporarily admitting compressed air to said cylinder.

46. In a pneumatic transmission system the combination with a movable receiver and a pneumatic motor $F^4$ for actuating the same, of a valve for controlling the admission of air to the motor, constantly-acting means, as spring $R^{12}$ tending to move the valve to position to move the receiver from its normal position of rest, a latch, as $R^{16}$, arranged to lock the valve in position to move and hold the receiver to and in its said normal position, an electromagnet arranged when energized to release said catch, a pneumatic cylinder and piston as $R^{10} R^{11}$ arranged when in operation to overcome spring $R^{12}$ and move the valve into engagement with latch $R^{16}$ and means, actuated by the escape of a carrier from the receiver for temporarily admitting compressed air to said cylinder.

47. In a pneumatic transmission system the combination with a movable receiver and a pneumatic motor $F^4$ for actuating the same, of a valve for controlling the admission of air to the motor, constantly-acting means, as spring $R^{12}$ tending to move the valve to position to move the receiver from its normal position of rest, a latch, as $R^{16}$, arranged to lock the valve in position to move and hold the receiver to and in its said normal position, a device actuated by the entry of a carrier to the receiver operating to release said catch, a pneumatic cylinder and piston, as $R^{10} R^{11}$, arranged when in operation to overcome spring $R^{12}$ and move the valve into engagement with latch $R^{16}$, means actuated by the escape of a carrier from the receiver for temporarily admitting compressed air to said cylinder and manually-operative means, as lever $R^{21}$ for moving the valve into engagement with the latch.

48. In a pneumatic transmission system the combination with a receiver movable from a receiving to a delivering and to a transmitting position, of a motor for actuating said receiver, a motor-controlling device, a pneumatic cylinder and piston connected with said device, means controlled by the exit of a carrier from the receiver at either the delivering or transmitting positions for temporarily admitting compressed air to said cylinder to shift the position of the piston and motor-controlling device, a latch for holding the piston and motor-controlling device in the position to which it is thus moved, and means energized by the entry of a carrier into the receiver for releasing said latch and shifting the piston and controlling device in the other direction.

49. In a receiving device for a pneumatic transmission system, substantially as specified, the combination with the receiver-actuating motor, and its controlling cylinder and piston $R^{10}$ $R^{11}$ of a conduit, as V V' $v'$ $V^3$ $V^4$, leading from a source of compressed air to said cylinder, an exhaust-port, a valve in said conduit arranged when open to connect the source of compressed air with the cylinder and when closed, to connect the cylinder to the exhaust-port, a valve-opening device arranged to be actuated by the exit of a carrier from the receiver and a pneumatic valve-closing device, as cylinder-piston $M^7$ $M^8$, connected with cylinder $R^{10}$ as described and so as to be operated by the air admitted to cylinder $R^{10}$ after it has shifted the piston therein.

50. In a receiving device for a pneumatic transmission system, substantially as specified, the combination with the receiver-actuating motor, and its controlling cylinder and piston $R^{10}$ $R^{11}$, said cylinder having a lateral port $R^{14}$ with a looped conduit, as V V' $v'$ $V^3$ $V^2$ $V^4$, leading from a source of compressed air to said cylinder, a valve and exhaust-port in each branch of the loop in said conduit, the valve arranged when open to connect the source of compressed air with the cylinder and when closed to connect the cylinder to an exhaust-port, a valve-opening device for each valve arranged to be actuated by the exit of a carrier from the receiver, a valve-box S and valve S' at the junction of the loop with conduit-section $V^4$ and pneumatic valve-closing devices, as cylinders and pistons $M^7$ $M^8$ and $L^7$ $L^8$ connected with a conduit $V^5$ $V^6$ $V^7$ leading from the port $R^{14}$ in cylinder $R^{10}$ as described and whereby the cylinders $M^7$ and $L^7$ are operated after the piston in cylinder $R^{10}$ has been shifted.

51. In a pneumatic transmission system the combination with a receiver movable from a receiving to a delivering and transmitting position, of a sender situated in the tube with which the receiver registers to transmit, a sender-lock $p^{52}$ arranged to be actuated to lock the sender on the entrance of a carrier to the receiver, a pneumatic cylinder and piston $P^{50}$ $P^{51}$ arranged when actuated to withdraw said lock, a motor for the receiver arranged to be actuated in one direction by the entry of a carrier to the receiver, a motor-reversing device comprising a pneumatic cylinder and piston $R^{10}$ $R^{11}$, means actuated by the exit of a carrier from the receiver for admitting air to cylinder $R^{10}$ and means as described whereby the air having actuated the piston of cylinder $R^{10}$ passes to and actuates cylinder $P^{50}$.

52. In a pneumatic transmission system the combination with a receiver movable from a receiving to a delivering and transmitting position, tubes arranged to register with said receiver in its receiving and transmitting positions and means for moving said receiver, of a sender situated in the tube with which the receiver registers to transmit, a sender-lock $p^{45}$ and a pneumatic cylinder and piston $P^{46}$ $P^{47}$ arranged to actuate said lock, a conduit for compressed air as V $v$ $V^8$ leading to cylinder $P^{46}$, a valve and exhaust-passage situated in said conduit, said valve being arranged to connect the cylinder with a source of compressed air when open and with the exhaust-passage when closed, means for opening said valve operated by the movement of the receiver from receiving position and a time-escapement for closing said valve.

53. In a pneumatic transmission system the combination with a receiver movable from a receiving to a delivering and transmitting position, tubes arranged to register with said receiver in its receiving and transmitting positions and means for moving said receiver, of a sender situated in the tube with which the receiver registers to transmit, a sender-lock $p^{45}$ and a pneumatic cylinder and piston $P^{46}$ $P^{47}$ arranged to actuate said lock, a conduit for compressed air, as V $v$ $V^8$ leading to cylinder $P^{46}$, a valve and an exhaust-passage situated in said conduit said valve being arranged to connect the cylinder with a source of compressed air when open and with the exhaust-passage when closed, means for opening said valve operated by the movement of the receiver from receiving position, a time-escapement for closing said valve, a sender-lock $p^{52}$ arranged to be actuated to lock the sender on the entrance of a carrier to the receiver, a pneumatic cylinder and piston $P^{50}$ $P^{51}$ arranged when actuated to withdraw said lock, a motor for the receiver arranged to be actuated in one direction by the entry of a carrier to the receiver, a motor-reversing device comprising a pneumatic cylinder and piston $R^{10}$ $R^{11}$, means actuated by the exit of a carrier from the receiver for admitting air to cylinder $R^{10}$ and means as described whereby the air having actuated the piston of cylinder $R^{10}$ passes to and actuates the piston in cylinder $P^{50}$.

54. In a pneumatic transmission system the combination of the rotary receiver, a frame supporting the same and the sender substantially as described with a time-escapement having an actuating-rod, as $Q^{10}$, and governing the motions of the receiver and sender as described, a lever $Q^4$ $Q^5$ to one end of which rod $Q^{10}$ is connected a lever $Q^7$ pivoted at one end to the frame of the receiver and on which lever $Q^4$ $Q^5$ is pivoted, said lever $Q^7$ having a cam-stud $q^7$, a rotary cam $Q^9$ moving with the receiver and acting on stud $q^7$ and a rod $Q^3$ actuated by the movements of the sender and connected to arm $Q^4$ of lever $Q^4$ $Q^5$ as described, all substantially as specified and so that the rod $Q^{10}$ is raised by either a movement of the sender or the receiver.

55. In a pneumatic transmission system substantially as specified, the combination with the rotary receiver and sender, of electromagnetic devices whereby the receiver is caused to deliver a carrier on the closing of certain circuits, a pneumatic device for locking the sender on the opening of a valve, a device for connecting such a circuit and opening said valve arranged to be actuated by a movement of either the receiver or the sender and a time-escapement governing the return movement of said device and the opening of the circuit and closing of the valve.

56. In a pneumatic transmission system substantially as described and in which a sender is situated in the tube on the delivery side of a receiver arranged to deliver or transmit a carrier, the combination with such sender and a motor for actuating it of a sender-lever, resilient means through which said lever acts on said sender-motor, a latch for holding said lever in active position, latch-releasing mechanism including a finger adapted to project into the tube on the delivery side of the sender and in the path of an outgoing carrier and means actuated by the motion of the sender whereby said finger is projected into the tube when the sender is operated to inject a carrier and withdrawn when said sender is in normal position.

57. In a pneumatic transmission system substantially as described and in which a sender is situated in the tube on the delivery side of a receiver arranged to deliver or transmit a carrier, the combination with such sender and a motor for actuating it of a sending-lever resilient means through which said lever acts on said sender-motor, a latch for holding said lever in active position, latch-releasing mechanism including a finger adapted to project into the tube on the delivery side of the sender and in the path of an outgoing carrier, an electromagnetic device whereby the receiver is caused to deliver a carrier entering it while certain circuits are closed, and a circuit-closing device attached to the sender-lever whereby such a circuit is closed when the lever is latched and opened when the lever is released.

58. In a pneumatic transmission system substantially as described and in which a sender is situated in the tube on the delivery side of a receiver arranged to deliver or transmit a carrier, the combination with such sender and a motor for actuating it of a sender-lever resilient means through which said lever acts on said sender-motor, a latch for holding said lever in active position, latch-releasing mechanism including a finger adapted to project into the tube on the delivery side of the sender in the path of an outgoing carrier, an electromagnetic device whereby the receiver is caused to deliver a carrier entering it while certain circuits are closed, a circuit-closing device attached to the sender-lever whereby such a circuit is closed when the lever is latched and opened when the lever is released, a second circuit acting on the same electromagnetic device, mechanism for closing said circuit actuated by the movement of the sender to inject a carrier and a time-escapement device for opening said second circuit.

BIRNEY C. BATCHELLER.

Witnesses:
  CHAS. F. MYERS,
  D. STEWART.